United States Patent
Sato

(10) Patent No.: US 9,415,775 B2
(45) Date of Patent: Aug. 16, 2016

(54) DRIVE ASSIST APPARATUS, AND DRIVE ASSIST METHOD

(71) Applicant: Minami Sato, Susono (JP)

(72) Inventor: Minami Sato, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/438,077

(22) PCT Filed: Nov. 13, 2012

(86) PCT No.: PCT/JP2012/079378
§ 371 (c)(1),
(2) Date: Apr. 23, 2015

(87) PCT Pub. No.: WO2014/076759
PCT Pub. Date: May 22, 2014

(65) Prior Publication Data
US 2015/0274162 A1    Oct. 1, 2015

(51) Int. Cl.
| | | |
|---|---|---|
| G01C 22/00 | (2006.01) |
| B60Q 1/00 | (2006.01) |
| B60T 7/16 | (2006.01) |
| B60W 30/09 | (2012.01) |
| B60W 10/04 | (2006.01) |
| B60W 30/08 | (2012.01) |
| B60W 30/14 | (2006.01) |
| B60W 30/16 | (2012.01) |

(52) U.S. Cl.
CPC ............. *B60W 30/09* (2013.01); *B60W 10/04* (2013.01); *B60W 30/08* (2013.01); *B60W 30/14* (2013.01); *B60W 30/16* (2013.01); *B60W 2720/00* (2013.01); *B60W 2750/308* (2013.01)

(58) Field of Classification Search
USPC .............................. 701/23; 340/436; 180/169
See application file for complete search history.

(56) References Cited

U.S. PATENT DOCUMENTS

2007/0030132 A1* 2/2007 Kobayashi ............ B60W 50/16
340/436
2007/0078602 A1* 4/2007 Yamamura ............. G08G 1/166
701/301

(Continued)

FOREIGN PATENT DOCUMENTS

| JP | 2002-036908 A | 2/2002 |
| JP | 2007076389 A | 3/2007 |
| JP | 2011022884 A | 2/2011 |

*Primary Examiner* — Thomas G Black
*Assistant Examiner* — Tyler Paige
(74) *Attorney, Agent, or Firm* — Sughrue Mion, PLLC

(57) ABSTRACT

Provided is a drive assist apparatus such that, in a vehicle in which a plurality of types of drive assist is implemented, the appropriateness of each drive assist can be maintained. A drive assist unit is provided with: a collision avoidance assist unit that implements individual drive assists; a vehicle-to-vehicle distance assist unit; and a cruise travel assist unit. An assist arbitration unit arbitrates between at least two or more drive assists when the at least two or more drive assists are implemented by the drive assist unit within a prescribed time on the basis of a plurality of types of assist elements.

13 Claims, 12 Drawing Sheets

(56) References Cited

U.S. PATENT DOCUMENTS

| | | | | |
|---|---|---|---|---|
| 2007/0106475 A1* | 5/2007 | Kondoh | B60K 26/021 | 701/301 |
| 2007/0142987 A1* | 6/2007 | Takamatsu | B60L 7/18 | 701/41 |
| 2007/0272464 A1* | 11/2007 | Takae | B60W 10/06 | 180/169 |
| 2007/0276577 A1* | 11/2007 | Kuge | B60W 10/06 | 701/96 |
| 2010/0179719 A1* | 7/2010 | Kimura | B60K 26/021 | 701/29.1 |
| 2011/0118929 A1* | 5/2011 | Takae | B60W 50/16 | 701/31.4 |
| 2013/0173113 A1* | 7/2013 | Takiguchi | B60K 26/021 | 701/36 |
| 2013/0226431 A1* | 8/2013 | Lu | B60W 50/0098 | 701/96 |
| 2014/0046509 A1* | 2/2014 | Otake | G08G 1/095 | 701/2 |

* cited by examiner

DRIVE ASSIST APPARATUS, AND DRIVE ASSIST METHOD

CROSS REFERENCE TO RELATED APPLICATIONS

This application is a National Stage of International Application No. PCT/JP2012/079378 filed Nov. 13, 2012, the contents of all of which are incorporated herein by reference in their entirety.

FIELD OF THE DISCLOSURE

The present invention relates to a driving assistance apparatus that assists in driving a vehicle and also relates to a driving assistance method.

BACKGROUND OF THE DISCLOSURE

In general, a driving assistance apparatus that assists in driving a vehicle uses an on-vehicle camera and a navigation system to obtain traffic information on a street crossing, a stop position, a curve, and approach of vehicles ahead, which require control of deceleration of the vehicle. Based on the thus obtained traffic information in the vicinity of vehicles, driving assistance such as guidance for deceleration by sound or deceleration assistance by providing braking force in a semi-compulsory manner is performed.

Conventionally, as an example of the driving assistance apparatus, there is known, for example, as disclosed in Patent Document 1, an apparatus that assists in controlling the distance between a vehicle that is an assistance target and a preceding vehicle, which travels ahead of the vehicle in an advancing direction. This apparatus recognizes, upon performance of driving assistance, the presence of the preceding vehicle by detecting a relative position and a relative speed of an object that is present ahead of the assistance target vehicle in the advancing direction. Next, upon detection of the preceding vehicle, the control of a vehicle-to-vehicle distance, by which the preceding vehicle is followed by the host vehicle, is performed. In controlling the vehicle-to-vehicle distance, for example, when the distance between the assistance target vehicle and a preceding vehicle, becomes greater than or equal to a predetermined distance, the control for accelerating the assistance target vehicle is performed. Further, when no preceding vehicle is detected, control of the speed of the vehicle, a so-called cruise control, which controls the speed of the assistance target vehicle at a set speed, is performed. In this cruise control, when the traveling speed of the assistance target vehicle becomes lower than the set speed, the vehicle is controlled to accelerate to the set speed.

PRIOR ART DOCUMENTS

Patent Documents

Patent Document 1: Japanese Laid-Open Patent Publication No. 2002-36908

SUMMARY OF THE INVENTION

Problems that the Invention is to Solve

In association with diversification of driving assistance, a plurality of types of driving assistance has been often provided for recent vehicles. Of the types of driving assistance, there are conflicting modes, for example, acceleration assistance, in which a vehicle that is an assistance target is accelerated and deceleration assistance, in which the assistance target vehicle is decelerated. If two types of conflicting assistance are performed at the same time or carried out alternately, the assistance target vehicle repeatedly decelerates and accelerates, which may cause a sense of discomfort to the driver.

The above-described problem is not limited to a vehicle in which driving assistance is performed by control of a vehicle-to-vehicle distance or cruise control but also found in common in vehicles in which a plurality of types of driving assistance are performed.

Accordingly, it is an objective of the present invention to provide a driving assistance apparatus capable of maintaining appropriateness of each type of driving assistance even in a vehicle in which a plurality of types of driving assistance are performed and also to provide a driving assistance method.

Means for Solving the Problems

Means for achieving the above objective and advantages thereof will now be discussed.

To achieve the foregoing objective, the present invention provides a driving assistance apparatus that assists in driving a vehicle. The apparatus includes a driving assisting section that performs different types of driving assistance by a plurality of assistance elements and an assistance arbitration section, which performs arbitration between at least two or more types of driving assistance when the at least two or more types of driving assistance are performed based on the assistance elements by the driving assisting section within a specified period of time that has been specified.

To achieve the foregoing objective, the present invention also provides a driving assistance method for assisting in driving a vehicle. The method includes a driving assistance step for performing different types of driving assistance by a plurality of assistance elements and an assistance arbitration step for executing arbitration between at least two types of driving assistance when the at least these two types of driving assistance based on an assistance element are performed via the driving assistance step within a specified period of time that has been specified.

According to the above-described configuration or the method, the types of driving assistance are performed in the assistance target vehicle based on a plurality of assistance elements. Moreover, when performance of two or more types of driving assistance is detected within a specified period of time, the two or more types of driving assistance are arbitrated. Accordingly, it is possible to suppress the performance of two or more types of driving assistance within a specified period of time. That is, within the specified period of time, only one type of driving assistance is performed based on one assistance element of the assistance elements. Therefore, it is possible to suppress different types of driving assistance from interfering with each other and prevent two or more types of driving assistance from being performed repeatedly within the specified period of time. Thereby, a vehicle in which the types of driving assistance are performed is able to maintain appropriateness of each type of driving assistance.

In accordance with one aspect of the present invention, when a request for activating driving assistance based on a second assistance element, which is one of the assistance elements, is detected during performance of driving assistance based on a first assistance element, which one of the assistance elements, or when a request for activating driving assistance based on the second assistance element is detected after termination of performance of driving assistance based on the first assistance element and before the lapse of the specified period of time, the assistance arbitration section performs, as the arbitration, one of a delay process for delaying the time at which driving assistance is activated based on the second assistance element and a suppression process for suppressing activation of driving assistance based on the second assistance element.

In accordance with one aspect of the present invention, in the assistance arbitration step, when a request for activating driving assistance based on a second assistance element, which one of the assistance element, is detected during performance of driving assistance based on a first assistance element, which one of the types of assistance element, or when a request for activating driving assistance based on the second assistance element is detected after termination of performance of driving assistance based on the first assistance element and before the lapse of the specified period of time, one of a delay step for delaying the time at which activation of driving assistance based on the second assistance element and a suppression step for suppressing activation of driving assistance based on the second assistance element is performed.

According to the above-described configuration or the method, when the request for activating the driving assistance based on the second assistance element is detected during performance of driving assistance based on the first assistance element, a delay process for delaying the time of activating the driving assistance based on the second assistance element is performed as arbitration. Accordingly, when the request for activating the driving assistance based on the second assistance element is made during performance of the driving assistance based on the first assistance element, for example, the driving assistance based on the second assistance element is performed after the lapse of a specified period of time from termination of the driving assistance based on the first assistance element. Therefore, it is possible to suppress performance of the driving assistance based on the first assistance element and the driving assistance based on the second assistance element within the specified period of time. The driving assistance based on the second assistance element, which has been temporarily suspended from activation, is performed after the lapse of the specified period of time from termination of the driving assistance based on the first assistance element. Thus, it is possible to ensure the advantages of the driving assistance by the driving assistance based on the second assistance element.

Further, according to the above-described configuration or the method, when the request for activating the driving assistance based on the second assistance element is detected during performance of the driving assistance based on the first assistance element, as arbitration, a suppression process for suppressing activation of the driving assistance based on the second assistance element is performed. Thereby, the request for activating the driving assistance based on the second assistance element, which has been made during performance of the driving assistance based on the first assistance element, is temporarily cancelled, thereby suppressing performance of the driving assistance based on the second assistance element. As a result, simultaneous performance of the driving assistance based on the first assistance element and the driving assistance based on the second assistance element are suppressed. Thereby, it is possible to prevent different types of driving assistance from interfering with each other. Moreover, upon confirmation that the specified period of time has elapsed after performance of the driving assistance based on the first assistance element and the request for activating the driving assistance based on the second assistance element, the driving assistance based on the second assistance element is performed. Thereby, at the time at which the request for activating the driving assistance based on the second assistance element is made again, in other words, at the time at which the driving assistance based on the second assistance element is greatly needed, activation thereof is permitted.

On the other hand, according to the above-described configuration or the method, when the request for activating the driving assistance based on the second assistance element is detected after termination of performance of the driving assistance based on the first assistance element but before the lapse of the specified period of time, a delay process for delaying the time of activating the driving assistance based on the second assistance element is performed as arbitration. Thereby, if the time at which the request for activating the driving assistance based on the second assistance element has been made is after termination of performance of the driving assistance based on the first assistance element but before the lapse of the specified period of time, activation of the driving assistance based on the second assistance element is temporarily suspended. Moreover, the driving assistance based on the second assistance element is permitted for activation upon confirmation of the lapse of the specified period of time, and the driving assistance is performed. It is possible to properly suppress each type of driving assistance from being performed based on the first and the second assistance elements within the specified period of time and also to ensure the advantages of the driving assistance by the driving assistance based on the second assistance element, which is suppressed from activation.

Still further, according to the above-described configuration or the method, if a request for activating the driving assistance based on the second assistance element is detected after termination of performance of the driving assistance based on the first assistance element but before the lapse of the specified period of time, as arbitration, a suppression process for suppressing activation of the driving assistance based on the second assistance element is performed. Thereby, the request for activating the driving assistance based on the second assistance element, which has been made after termination of performance of the driving assistance based on the first assistance element and before the lapse of the specified period of time, is temporarily cancelled to suppress the performance thereof. Moreover, upon confirmation that the request for activating the driving assistance based on the second assistance element has been made after the lapse of the specified period of time, the driving assistance based on the second assistance element is performed. Thereby, at the time at which the request for activating the driving assistance based on the second assistance element is made again, in other words, at the time at which the driving assistance based on the second assistance element is greatly needed, activation thereof is permitted.

In accordance with one aspect of the present invention, at least two types of driving assistance based on the assistance elements are different types of driving assistance in conflicting assistance modes.

In accordance with one aspect of the present invention, different types of driving assistance in conflicting assistance modes are selected as at least two types of driving assistance based on the assistance elements.

When various types of driving assistance in conflicting modes are performed within a specified period of time, these types of driving assistance counteract each other and interfere with each other, by which these types of driving assistance are decreased in assistance advantages. Further, if the types of driving assistance in conflicting modes are performed repeatedly within the specified period of time, the driver will have an increased sense of discomfort.

In this respect, according to the above-described configuration or the method, different types of driving assistance in conflicting modes, which are at least two types of driving assistance based on a plurality of assistance elements, are arbitrated. Therefore, it is possible to maintain appropriateness of each type of driving assistance in conflicting modes and also maintain assistance advantages by each type of driving assistance.

In accordance with one aspect of the present invention, the different types of driving assistance in conflicting assistance modes include acceleration assistance, which assists in acceleration of a vehicle that is an assistance target, and deceleration assistance, which assists in deceleration of the vehicle, which is an assistance target.

In accordance with one aspect of the present invention, as the different types of driving assistance in conflicting assistance modes, there are selected acceleration assistance, which assists in acceleration of the assistance target vehicle, and deceleration assistance, which decelerates the assistance target vehicle.

As driving assistance, usually, there are often performed deceleration assistance, which assists in deceleration of the assistance target vehicle, and acceleration assistance, which assists in acceleration of the assistance target vehicle. On the other hand, each type of the deceleration assistance and the acceleration assistance is a type of assistance that decelerates or accelerates the vehicle and greatly influences the state of the vehicle. Therefore, if the deceleration assistance and the acceleration assistance are performed at the same time or repeatedly performed within a short period of time, the driver will experience an increased sense of discomfort.

In this respect, according to the above-described configuration or the method, the acceleration assistance and the deceleration assistance are arbitrated. Therefore, the acceleration assistance and the deceleration assistance, each of which gives a great influence on the state of the vehicle, can be arbitrated to smoothly perform the acceleration assistance and the deceleration assistance. Thereby, acceleration of the vehicle by the acceleration assistance and deceleration of the vehicle by the deceleration assistance can be performed smoothly to ensure the advantages of these types of driving assistance. Accordingly, the driver will experience the minimized sense of discomfort, even in a vehicle in which the acceleration assistance and the deceleration assistance in a mutually conflicting mode can be performed.

In accordance with one aspect of the present invention, the assistance elements include at least two of: a vehicle-to-vehicle distance assisting section, which assists in controlling a distance between the assistance target vehicle and a preceding vehicle that travels ahead of the assistance target vehicle in the advancing direction; a constant speed travel assisting section, which assists the assistance target vehicle in traveling at a constant speed; a collision avoidance assisting section, which assists in avoidance of collision between the assistance target vehicle and a physical object present in the vicinity of the vehicle; and an autonomous travel assisting section, which assists the assistance target vehicle in traveling autonomously.

In accordance with one aspect of the present invention, as driving assistance by the assistance elements, at least two types of assistance are selected from: vehicle-to-vehicle distance assistance, which assists in controlling a distance between the assistance target vehicle and a preceding vehicle, which travels ahead of the assistance target vehicle in the advancing direction; constant speed traveling assistance, which assists the assistance target vehicle in traveling at a constant speed; collision avoiding assistance, which assists in avoidance of collision between the assistance target vehicle and a physical object present in the vicinity of the vehicle; and autonomous travel assistance, which assists the assistance target vehicle in traveling autonomously.

As driving assistance performed in a vehicle, there are mainly available vehicle-to-vehicle distance assistance, which assists in controlling the distance between the assistance target vehicle and a preceding vehicle, which travels ahead of the assistance target vehicle in the advancing direction, and constant speed traveling assistance, which assists the assistance target vehicle in traveling at a constant speed. Of these types of driving assistance, the vehicle-to-vehicle distance assistance gives deceleration assistance and acceleration assistance to the assistance target vehicle in order to maintain the distance between the assistance target vehicle and a preceding vehicle at a specified distance. In a similar manner, the constant speed traveling assistance gives deceleration assistance and acceleration assistance to the assistance target vehicle in order to maintain the traveling speed of the assistance target vehicle at a specified speed.

Further, as driving assistance that is now under development, there are collision avoiding assistance, which assists in avoidance of collision between an assistance target vehicle and a physical object present in the vicinity of the vehicle, and autonomous travel assistance, which assists the assistance target vehicle in autonomous traveling. Of these types of driving assistance, the collision avoiding assistance provides assistance that assists in prompting deceleration and a change in course in order to avoid collision between the assistance target vehicle and a physical object present in the vicinity thereof. Further, the autonomous travel assistance provides, for example, autonomous travel in which a vehicle takes autonomously curve actions along white lines on the road or follows a preceding vehicle.

On the other hand, in each type of driving assistance, there is provided assistance in prompting deceleration, acceleration and a change in the turning angle taken by the assistance target vehicle. It is, however, estimated that different types of assistance in conflicting modes are performed depending on traveling environments.

In this respect, according to the above-described configuration or the method, even if the assistance target has at least two assistance functions of the vehicle-to-vehicle distance assistance, the constant speed traveling assistance, the collision avoiding assistance, and the autonomous travel assistance, these types of driving assistance are arbitrated. It is, thereby, possible to realize smooth performance of each of maintenance of the distance between the assistance target vehicle and a preceding vehicle, constant speed traveling of the assistance target vehicle, avoidance of collision between the assistance target vehicle and a physical object, and autonomous travel.

In accordance with one aspect of the present invention, the physical object is a movable body. Based on a relationship between a first time taken by the assistance target vehicle to reach a meeting point where the vehicle meets the movable body and a second time taken by the movable body to reach the meeting point, the collision avoidance assisting section assists in avoidance of collision between the vehicle and the movable body. The assistance arbitration section arbitrates, as targets of the arbitration, deceleration assistance performed by the collision avoidance assisting section to assist in avoidance of collision between the assistance target vehicle and the physical object and acceleration assistance performed, as acceleration control, on the assistance target vehicle by at least one of the vehicle-to-vehicle distance assisting section, the constant speed travel assisting section, and the autonomous travel assisting section.

In accordance with one aspect of the present invention, a movable body is selected as the physical object. As the collision avoiding assistance, based on a relationship between a first time taken by the assistance target vehicle to reach a meeting point where the movable body meets the vehicle and a second time taken by the movable body to reach the meeting point, assistance that assists in avoidance of collision between the vehicle and the movable body is performed. In the assistance arbitration step, arbitration is performed between deceleration assistance for avoiding collision between the assistance target vehicle and a physical object by the collision avoiding assistance and acceleration assistance for accelerating a vehicle that is performed as at least one of the vehicle-to-vehicle distance assistance, the constant speed traveling assistance, and the autonomous travel assistance.

Although at a certain time point no movable body is present ahead of a vehicle in the advancing direction, when the movable body reaches at the same time the vicinity of a position that the vehicle reaches after the lapse of a predetermined period of time, it is more likely that the vehicle may collide with the movable body or they approach too close. On the other hand, if the driver is able to be aware in advance of the time taken by the vehicle and the movable body to reach the point at which the vehicle and the movable body abnormally approach each other, in other words, the site at which the vehicle meets the movable body, the driver is able to prevent near collision between the vehicle and the movable body before the vehicle abnormally approaches the movable body.

Next, according to the above-described configuration or the method, based on a relative relationship between the first time taken by the vehicle to reach a meeting point of the vehicle and a movable body, and the second time taken by the movable body to reach the meeting point, driving assistance is performed to suppress near collision between the vehicle and the movable body. Accordingly, near collision between the vehicle and the movable body is suppressed by slowly reducing the speed of the vehicle without requesting hard braking, abrupt braking operation or the like, thereby the driving assistance is smoothly performed.

On the other hand, when acceleration control is performed on the assistance target vehicle in the course of performance of the collision avoiding assistance or immediately after the performance via at least one of the vehicle-to-vehicle distance assistance, the constant speed traveling assistance and the autonomous travel assistance, the vehicle, which has been decelerated by the collision avoiding assistance, is increased in traveling speed. As a result, there is a fear that assistance advantages resulting from the collision avoiding assistance may be decreased.

Further, when the vehicle, which has been decelerated by the collision avoiding assistance, is increased in traveling speed, the collision avoiding assistance is performed again. On the other hand, there is a fear that acceleration control may be performed again by the vehicle-to-vehicle distance assistance or the constant speed traveling assistance or the autonomous travel assistance in an attempt to increase the traveling speed of the vehicle, which has been decelerated by the collision avoiding assistance up to a predetermined speed. As a result, there will be repeatedly performed deceleration by the collision avoiding assistance and acceleration by the vehicle-to-vehicle distance assistance, the constant speed traveling assistance and the autonomous travel assistance.

In this respect, according to the above-described configuration or the method, the collision avoiding assistance as well as the vehicle-to-vehicle distance assistance, the constant speed traveling assistance and the autonomous travel assistance in which acceleration control is performed as one assistance mode are arbitrated. Therefore, there is no chance that assistance in prompting deceleration and acceleration will be performed alternately due to the fact that various types of assistance interfere with each other. Thereby, it is possible to provide one vehicle with the collision avoiding assistance function together with at least one of functions of the vehicle-to-vehicle distance assistance, the constant speed traveling assistance, and the autonomous travel assistance, with these assistance functions maintained.

In accordance with one aspect of the present invention, the collision avoidance assisting section performs a process for assisting in avoidance of collision between the assistance target vehicle and the movable body on the condition that each of the first time and the second time is less than or equal to a specified threshold value. The assistance arbitration section performs a process for suppressing activation of the acceleration assistance by at least one of the vehicle-to-vehicle distance assisting section, the constant speed travel assisting section, and the autonomous travel assisting section in a period of time during which the first time and the second time are less than or equal to the threshold value.

According to the above-described configuration or the method, on the condition that the first time and the second time are less than or equal to a specified threshold value, the collision avoiding assistance is performed. Moreover, during a period in which the first time and the second time are less than or equal to a specified threshold value, in other words, during a period in which the collision avoiding assistance is performed, activation of the acceleration assistance by at least one of the vehicle-to-vehicle distance assisting section, the constant speed travel assisting section, and the autonomous travel assisting section is suppressed. It is, therefore, possible to properly suppress a vehicle from being prompted for acceleration by the acceleration assistance in the course of performance of the collision avoiding assistance.

In accordance with one aspect of the present invention, the collision avoidance assisting section has a map in which an assistance region of performing driving assistance and non-assistance region of performing no driving assistance are specified with respect to a relative relationship between the first time and the second time. The collision avoidance assisting section performs the collision avoiding assistance by referring to the map.

According to the above-described configuration, upon performance of the collision avoiding assistance, a map is used in which an assistance region of performing driving assistance and a non-assistance region of performing no driving assistance are specified with respect to a relative relationship between the first time and the second time. Therefore, depending on in which region the first time and the second time based on the assistance target vehicle and a movable body in the vicinity thereof belong to the assistance region or the non-assistance region in the map, it is determined as to whether the collision avoiding assistance should be requested for activation. It is, thereby, possible to easily determine whether activation of the collision avoiding assistance is needed.

In accordance with one aspect of the present invention, at least two types of driving assistance based on the assistance elements include deceleration assistance, which prompts deceleration of the assistance target vehicle. The driving assisting section calculates a control amount in accordance with required deceleration for each assistance element. When detecting requests for activating two or more types of deceleration assistance within the specified period of time, the assistance arbitration section permits, as the arbitration, activation of only deceleration assistance having a maximum control amount of the thus calculated control amounts.

Various types of driving assistance based on a plurality of assistance elements include driving assistance, which decelerates a vehicle of an assistance target. On the other hand, deceleration by each type of driving assistance is performed for different purposes such as deceleration for avoiding collision and deceleration for maintaining a vehicle-to-vehicle distance. Therefore, a deceleration amount of a vehicle by each type of driving assistance and also a control amount for deceleration assistance are different in various types of driving assistance. If different types of deceleration assistance are performed individually, the types of deceleration assistance are performed at the same time or deceleration assistance is performed several times in a short period of time. As a result, there is a fear that the vehicle may be unnecessarily reduced in traveling speed. There is also a fear that the vehicle may be unnecessarily reduced in traveling speed and deceleration assistance may be performed repeatedly to cause a sense of discomfort to the driver.

In this respect, according to the above-described configuration, even where two or more types of deceleration assistance are performed in the assistance target vehicle, each type of deceleration assistance is arbitrated. Thus, it is possible to decelerate the vehicle smoothly to a necessary and sufficient extent.

Further, in the above-described configuration, as arbitration, only activation of deceleration assistance having a maximum control amount among control amounts calculated upon deceleration assistance is permitted. Thereby, in view of any one of various types of deceleration assistance that is a target of arbitration, it is possible to meet a deceleration amount requested in each type of assistance.

DETAILED DESCRIPTION OF THE PREFERRED EMBODIMENTS

First Embodiment

Hereinafter, a description will be given of a driving assistance apparatus and a driving assistance method according to a first embodiment of the present invention with reference to FIGS. 1 to 8.

Figure 1:
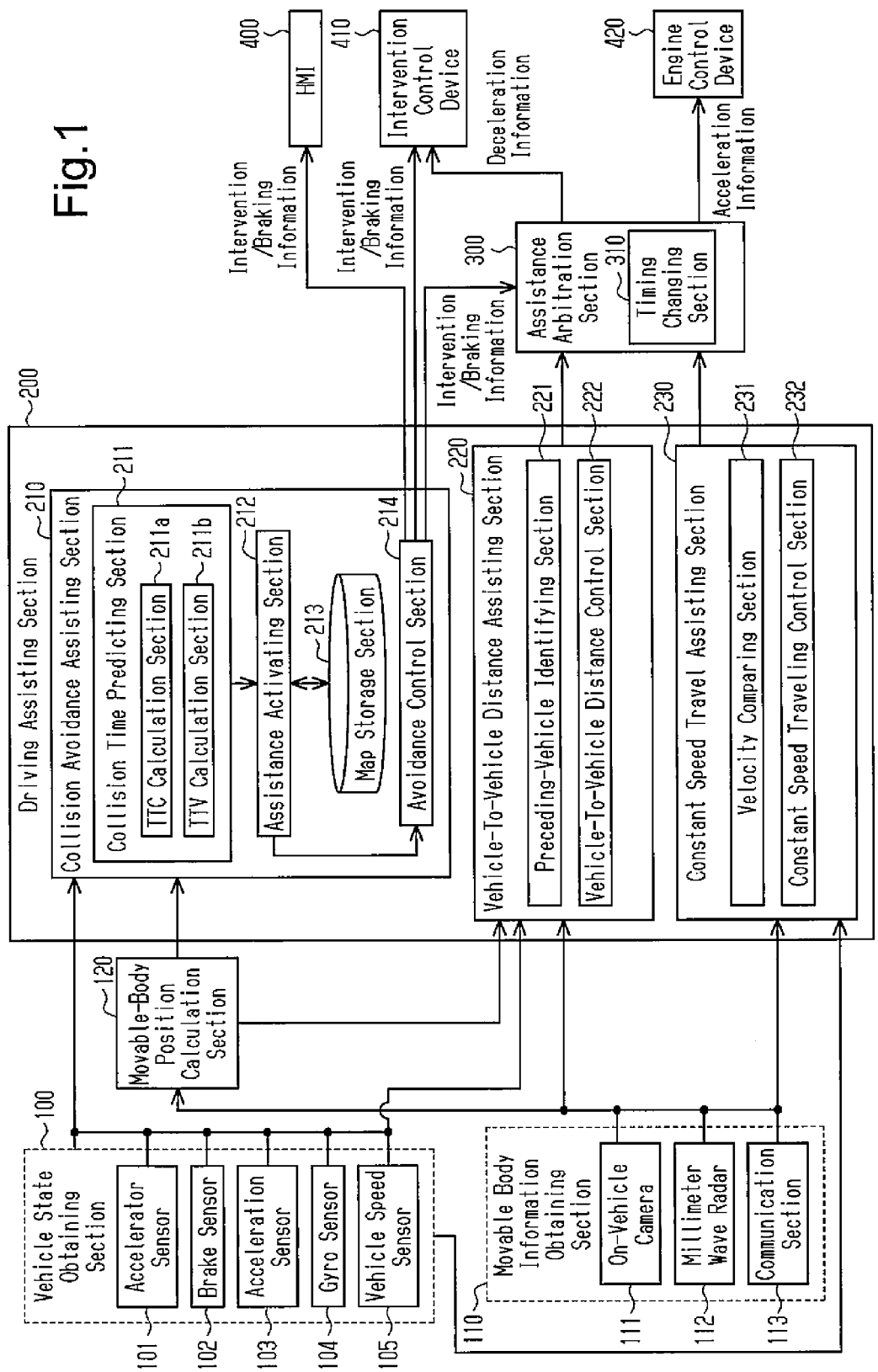
FIG. 1 is a block diagram showing a schematic configuration of a vehicle to which a driving assistance apparatus and a driving assistance method of a first embodiment of the present invention are applied.

As shown in FIG. 1, a vehicle to which the driving assistance apparatus and the driving assistance method of the present embodiment are applied is provided with a vehicle state obtaining section 100, which obtains information on a state of the vehicle. The vehicle is also provided with a movable body information obtaining section 110, which obtains information on a physical object that is a movable body such as a person or a vehicle present in the vicinity of a vehicle that is an assistance target.

The vehicle state obtaining section 100 is configured by, for example, an accelerator sensor 101, a brake sensor 102, an acceleration sensor 103, a gyro sensor 104, and a vehicle speed sensor 105. Each of the sensors 101 to 105 is electrically connected to a driving assisting section 200, which performs driving assistance based on detection results by these sensors 101 to 105.

The accelerator sensor 101 detects a depressing amount of an accelerator, which varies by operation of the accelerator pedal by the driver, and outputs a signal in accordance with the detected depressing amount of the accelerator to the on-vehicle driving assisting section 200. The brake sensor 102 detects whether the driver operates the brake pedal and outputs a signal in accordance with the thus detected operation to the driving assisting section 200. The acceleration sensor 103 detects acceleration of the vehicle and outputs a signal in accordance with the thus detected acceleration to the driving assisting section 200. The gyro sensor 104 detects the direction in which the vehicle moves and outputs a signal in accordance with the thus detected advancing direction to the driving assisting section 200. The vehicle speed sensor 105 detects a vehicle speed, which is the speed of the vehicle, and outputs a signal in accordance with the thus detected vehicle speed to the driving assisting section 200.

The movable body information obtaining section 110 is provided with an on-vehicle camera 111, which is mounted on the vehicle to pick up images of surrounding environments of the vehicle, a millimeter wave radar 112, which detects objects present in the vicinity of the vehicle, and a communication apparatus 113, which has a wireless communication function.

The on-vehicle camera 111 picks up images of a predetermined range ahead of the vehicle by using an optical charge coupled device (CCD) camera installed at the back of a rearview mirror or the like. The on-vehicle camera 111 outputs image signals based on picked up images to the driving assisting section 200.

The millimeter wave radar 112 is provided with a distance measurement function for measuring a distance between, for example, an object present in the vicinity of a vehicle and the host vehicle, and a speed measurement function for measuring a relative speed between the object and the host vehicle. Upon detection of an object present in the vicinity of the host vehicle, the millimeter wave radar 112 outputs a signal that represents the detection result to the driving assisting section 200.

The communication apparatus 113 obtains information on traveling speed and latitude/longitude of the other vehicle via inter-vehicle communications with, for example, the other vehicle present in the vicinity of the host vehicle. The communication apparatus 113 outputs the thus obtained information to the driving assisting section 200. The communication apparatus 113 also makes road-to-vehicle communications with an optical beacon antenna installed on a road. The communication apparatus 113 obtains an infrastructure information signal via road-to-vehicle communications with the optical beacon antenna. Upon receiving the infrastructure information signal, the communication apparatus 113 outputs the thus received infrastructure information signal to the driving assisting section 200. The infrastructure information signal includes, for example, the distance up to a street crossing, the signal cycle of a signal generator installed on the street crossing, a geometric line form of road and road conditions on which the optical beacon antenna is installed (the shape of street crossings, the curvature, the gradient, and the number of lanes). The infrastructure information signal also includes information in association with the road and information on movable bodies such as other vehicles in the vicinity of the street crossing detected by ground facilities.

A movable body position calculation section 120 calculates the position of a movable body detected based on information input from the movable body information obtaining section 110. The movable body position calculation section 120 makes analysis of picked up images shown by an image signal input from, for example, the on-vehicle camera 111, thereby identifying a movable body present in the vicinity of the vehicle and the position of the movable body. Further, the movable body position calculation section 120 determines the distance between a movable body present in the vicinity and the host vehicle and the moving speed of the movable body by a signal input from, for example, the millimeter wave radar 112. Still further, the movable body position calculation section 120 identifies the direction in which the movable body present in the vicinity of the host vehicle moves based on a signal input from, for example, the millimeter wave radar 112. In addition thereto, upon input of infrastructure information from the communication apparatus 113, the movable body position calculation section 120 identifies the distance between the movable body present in the vicinity of the host vehicle and the host vehicle, the moving speed of the movable body and the movement direction of the movable body based on the infrastructure information. The movable body position calculation section 120 outputs a signal showing the identification result to the driving assisting section 200.

The movable body is identified, for example, based on any one of the picked up result of the on-vehicle camera 111, the signal input from the millimeter wave radar 112 and the infrastructure information input from the communication apparatus 113.

The driving assisting section 200 is provided with a collision avoidance assisting section 210, which performs collision avoiding assistance in avoidance of collision between the assistance target vehicle and a movable body present in the vicinity thereof, that is, a physical object. The driving assisting section 200 is also provided with a vehicle-to-vehicle distance assisting section 220, which performs vehicle-to-vehicle distance control assistance that assists in controlling the distance between the assistance target vehicle and a preceding vehicle that is ahead of the vehicle. Further, the driving assisting section 200 is provided with a constant speed travel assisting section 230, which performs constant speed traveling control assistance for assisting the assistance target vehicle in traveling at a constant speed. In the present embodiment, the first assistance element is configured by the collision avoidance assisting section 210, and the second assistance element is configured by the vehicle-to-vehicle distance assisting section 220, and the constant speed travel assisting section 230.

The collision avoidance assisting section 210 is provided with a collision time predicting section 211, which predicts the time taken by the host vehicle and a movable body to reach a meeting point at which the movable body present in the vicinity thereof and the host vehicle meet each other.

The driving assisting section 200 is connected with an on-vehicle human machine interface (HMI) 400, which transmits various types of information to the driver, and an on-vehicle intervention control device 410, which performs intervention control.

The collision time predicting section 211 is provided with a TTC calculation section 211a which calculates a first time TTC (Time To Collision) which reaches a meeting point of a vehicle and a movable body. The first time TTC of the present embodiment corresponds to the time taken by the host vehicle to reach a point of collision with the movable body when the host vehicle travels while maintaining the current course and the current traveling speed.

The TTC calculation section 211a calculates the first time TTC based on the following expression (1), where the traveling speed of the host vehicle is represented by V, the relative position of the movable body in relation to the host vehicle is represented by as x, and the speed of the movable body is represented by vx.

$$TTC = x/(V-vx) \qquad (1)$$

The TTC calculation section 211a determines the traveling speed of the host vehicle V based on detection results of the vehicle speed sensor 105. The TTC calculation section 211a also determines the position of the movable body x and the speed of the movable body vx based on signals input from the movable body information obtaining section 110.

Further, the collision time predicting section 211 is provided with a TTV calculation section 211b, which calculates a second time TTV (Time To Vehicle) taken by a movable body to reach a meeting point. The second time TTV of the present embodiment corresponds to the time taken by the movable body to reach a point of collision with a vehicle when the movable body moves while maintaining the current course and the current traveling speed.

The TTV calculation section 211b calculates the second time TTV based on the following expression (2), where the relative position of the own vehicle in relation to the movable body is represented by y and the speed of the movable body is represented by vy.

$$TTV = y/(vy) \qquad (2)$$

The TTV calculation section 211b determines the relative position y of the movable body in relation to the host vehicle and the speed of the movable body vy based on signals input from the movable body information obtaining section 110.

Figure 2:
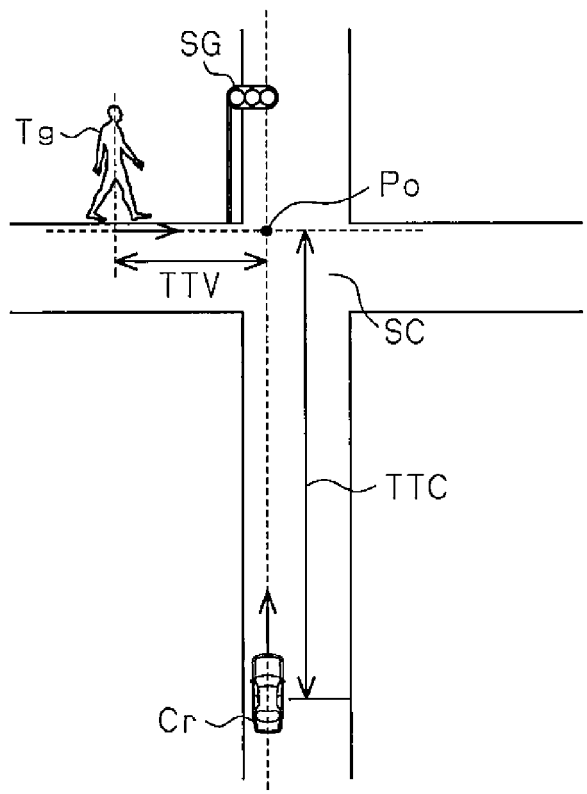
FIG. 2 is a schematic diagram showing a relative relationship between a vehicle and a pedestrian that intersect at a street crossing.

As illustrated in FIG. 2, it is assumed that a vehicle Cr, which is an assistance target, and a pedestrian Tg move in a direction in which they meet each other toward a street crossing SC at which a signal generator SG is installed. In this illustrated example, the time taken by the vehicle Cr to reach a meeting point Po of the vehicle Cr and the pedestrian Tg corresponds to the first time TTC. Further, the time taken by the pedestrian Tg to reach the meeting point Po corresponds to the second time TTV. That is, the meeting point Po is an intersection point at which a predicted movement path of the vehicle Cr intersects a predicted movement path of the movable body.

Further, as shown in FIG. 1, the collision avoidance assisting section 210 of the present embodiment is provided with a map storage section 213, which stores a map showing a relative positional relationship between the first time TTC and the second time TTV.

Figure 3:
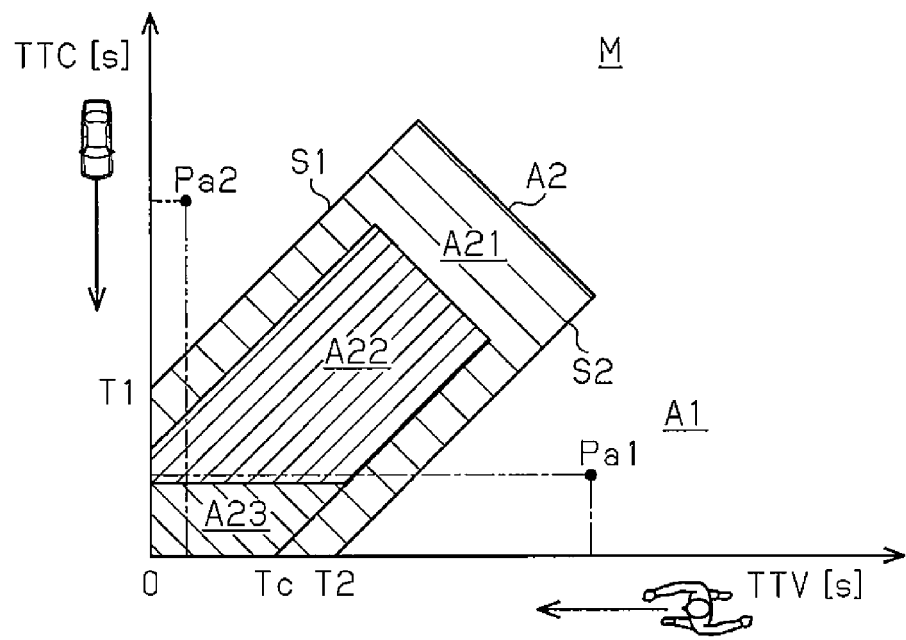
FIG. 3 is a map showing a relative relationship between a first time and a second time.

As shown in FIG. 3, the map storage section 213 records a map M that is specified so that the longitudinal axis indicates the first time TTC [s] and the horizontal axis indicates the second time TTV [s]. In the map M, the origin [0] corresponds to the meeting point Po of the vehicle Cr and the pedestrian Tg in FIG. 2. In the map M, the intersection point of the first time TTC and the second time TTV is spaced away from the origin with an increase in the first time TTC or the second time TTV. Moreover, as the intersection point of the first time TTC and the second time TTV is spaced away at greater distances from the origin, the vehicle Cr and the pedestrian Tg at a calculation time point of the first time TTC and the second time TTV are positioned at sites spaced mutually away at greater distances from the meeting point Po.

Further, in the map M of the present embodiment, there is provided a non-assistance region A1, which will not activate collision avoiding assistance in avoidance of collision between a vehicle Cr, which is an assistance target, and a movable body such as a pedestrian Tg or another vehicle. In the map M, there is also provided an assistance region A2, which will activate the collision avoiding assistance. The non-assistance region A1 and the assistance region A2 are, for example, an area specified based on experiment data and the like. It is also possible to provide the non-assistance region A1 and the assistance region A2 based on learning results of driving characteristics such as accelerator characteristics and brake characteristics of the driver.

In the present embodiment, when the relative position between the above-calculated first time TTC and the second time TTV in the map M is located at the non-assistance region A1, no condition for activating the collision avoiding assistance is met. On the contrary, when the relative position of the calculated first time TTC and the second time TTV in the map M is located at the assistance region A2, the condition for activating the collision avoiding assistance is met.

The assistance region A2 is a region enclosed by a function of y=fx (TTC, TTV). Two ever-increasing straight lines S1 and S2 which form a boundary line between the assistance region A2 and the non-assistance region A1 are set by a difference (TTC-TTV) between the first time TTC and the second time TTV. Time corresponding to 1 to 3 seconds, for example, is set in time T1 when the straight line S1 crosses vertically the first time TTC. In a similar manner, time corresponding to 1 to 3 seconds, for example, is also set in time T2 when the straight line S2 crosses the horizontal axis of the second time TTV.

As shown in FIG. 3, the assistance region A2 is divided into a HMI area A21, an intervention control area A22 and an emergency intervention control area A23 in accordance with the urgency of driving assistance.

The HMI area A21 is specified at a position most distant from the origin 0 between the first time TTC and the second time TTV in the assistance region A2. The HMI area A21 is an area in which the driver is given driving assistance which warns the presence of a movable body and near collision between the vehicle Cr and the movable body. Driving assistance which is specified in the HMI area A21 is performed when the above-calculated first time TTC and the second time TTV are positioned in the HMI area A21.

The intervention control area A22 is an area in which intervention control such as braking is performed and is positioned at a site closer to the origin 0 than the HMI area A21. The emergency intervention control area A23 is an area in which emergency intervention such as hard braking is performed in order to avoid collision between a movable body and a vehicle Cr and is positioned in a predetermined range from the origin 0. The emergency intervention control area A23 is positioned at a site which is closest to the origin 0 in the assistance region A2 and specified at a position closest to the meeting point Po of the vehicle Cr and the movable body.

The non-assistance region A1 is a part other than the assistance region A2 and an area that does not need driving assistance in avoidance of collision between the vehicle Cr and a movable body. For example, in FIG. 3, a point Pa1 (TTV, TTC) positioned within the non-assistance region A1 is given as the first time TTC << the second time TTV. When the first time TTC << the second time TTV, the movable body reaches the meeting point Po after the lapse of time greater than or equal to a predetermined time from the time when the vehicle Cr has passed through the meeting point. In contrast, a point Pa 2 (TTV, TTC) positioned within the non-assistance region A1 is given as the first time TTC >> the second time TTV. When the first time TTC >> the second time TTV, the vehicle Cr reaches the meeting point Po after the lapse of time greater than or equal to a predetermined time from the time when the movable body has passed through the meeting point. Thereby, in the non-assistance region A1, time at which the vehicle Cr and the movable body reach the meeting point Po is different by time greater than or equal to a predetermined time, and a distance between the vehicle Cr and the movable body is kept apart at a distance greater than or equal to a predetermined distance, driving assistance is not necessary.

As shown in FIG. 1, an assistance activating section 212, which forms the collision avoidance assisting section 210, determines whether the condition of activating the collision avoiding assistance has been met. The assistance activating section 212 determines whether the condition of activation has been met based on the above-calculated first time TTC and the second time TTV as well as the map M. The assistance activating section 212 determines that the condition of activating the collision avoiding assistance has been met when the above-calculated first time TTC and the second time TTV is positioned in any one of the HMI area A21, the intervention control area A22 and the emergency intervention control area A23, which form the assistance region A2.

Upon calculation of the first time TTC and the second time TTV, the assistance activating section 212 identifies at which area on the map M the intersection point of the first time TTC and the second time TTV is positioned.

Figure 4:
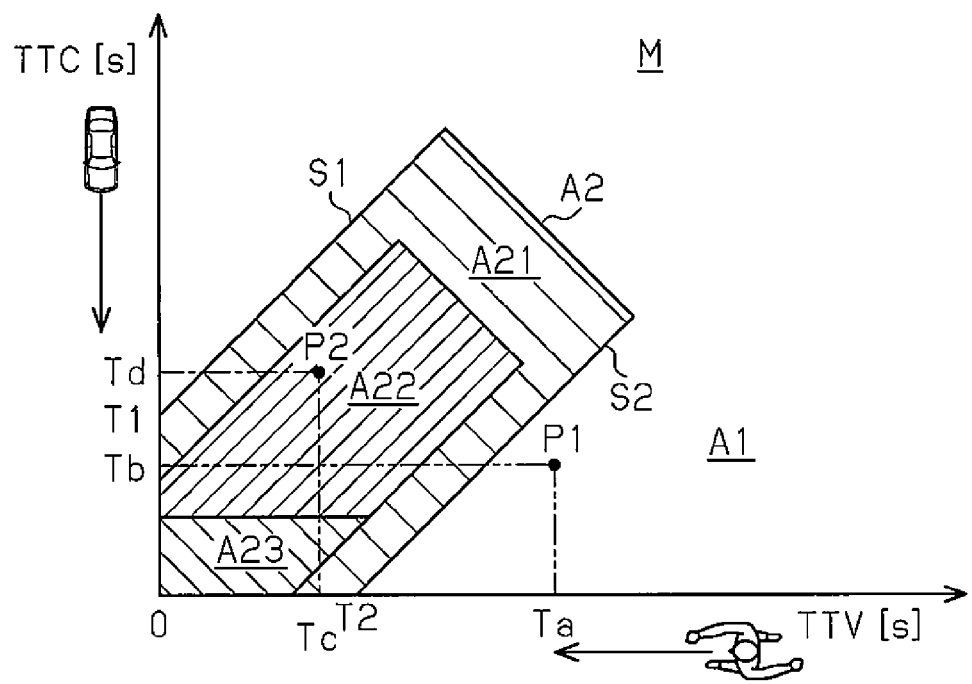
FIG. 4 is a map showing a relative relationship between the first time and the second time.

As illustrated in FIG. 4, when a position (intersection point) at which the first time TTC intersects the second time TTV is a point P1 (Ta, Tb), the point P1 is positioned in the non-assistance region A1. Accordingly, the assistance activating section 212 determines that no condition of activating the collision avoiding assistance is met. On the other hand, when the position at which the first time TTC intersects the second time TTV is a point P2 (Tc, Td), the point P2 is positioned in the assistance region A2. Therefore, the assistance activating section 212 determines that the condition of activating the collision avoiding assistance is met.

In the present embodiment, the intersection point at which the first time TTC intersects the second time TTV indicates a relative relationship between the first time TTC and the second time TTV.

When the condition of activation is met, the assistance activating section 212 outputs a signal that indicates areas (the HMI area A21, the intervention control area A22 and the emergency intervention control area A23) at which the above-calculated first time TTC intersects the second time TTV to an avoidance control section 214, which performs collision avoiding assistance, as shown in FIG. 1. Further, when the condition of activation is met, the assistance activating section 212 outputs to the avoidance control section 214 signals that indicate, for example, the above-calculated first time TTC and the second time TTV as well as latitude/longitude of a meeting point.

Upon input of various signals from the assistance activating section 212, the avoidance control section 214 selects driving assistance in accordance with the HMI area A21, the intervention control area A22 and the emergency intervention control area A23. The avoidance control section 214 generates a warning instructing signal for activating warning by a HMI 400 when the intersection point of the above-calculated first time TTC and the second time TTV is positioned in the HMI area A21. Next, the avoidance control section 214 outputs the thus generated warning instructing signal to the HMI 400. The warning instructing signal includes, for example, a position of the movable body, which is predicted to collide with a vehicle Cr, the distance up to the movable body and predicted time of collision.

Further, the avoidance control section 214 generates intervention control information for allowing the intervention control device 410 to perform intervention control when the intersection point of the above-described first time TTC and the second time TTV is positioned in the intervention control area A22 or the emergency intervention control area A23. Then, the avoidance control section 214 outputs the generated intervention control information to the intervention control device 410, which applies braking so that a vehicle is reduced in traveling speed. Thereby, the avoidance control section 214 of the present embodiment performs deceleration assistance, which assists in reducing the traveling speed of the host vehicle via the intervention control device 410. The avoidance control section 214 of the present embodiment outputs the intervention control information also to an on-vehicle assistance arbitration section 300, which performs an arbitration process for arbitrating a plurality of types of driving assistance.

The intervention control information includes, for example, a control amount such as a deceleration amount of a brake which is capable of bringing the first time TTC positioned within the assistance region A2 to outside the assistance region A2, that is, within the non-assistance region A1. The control amount indicated by the intervention control information is set so that a control amount of the emergency intervention control area A23 is greater than a control amount of the intervention control area A22.

On the other hand, the vehicle-to-vehicle distance assisting section 220, which forms the driving assisting section 200, is provided with a preceding vehicle identifying section 221, which identifies a vehicle preceding vehicle the assistance target vehicle based on information on a movable body input from the movable body information obtaining section 110 and the movable body position calculation section 120. The vehicle-to-vehicle distance assisting section 220 is also provided with a vehicle-to-vehicle distance control section 222, which controls the distance between the host vehicle and a vehicle identified by the preceding vehicle identifying section 221.

When the information on a movable body present in the vicinity of the assistance target vehicle is obtained from the movable body information obtaining section 110, the preceding vehicle identifying section 221 determines whether the movable body is a vehicle based on the information. Further, the preceding vehicle identifying section 221 obtains information which shows a relative speed of the identified vehicle with respect to the host vehicle from, for example, the millimeter wave radar 112. The preceding vehicle identifying section 221 determines that the identified vehicle is a preceding vehicle which travels ahead of the host vehicle in an advancing direction, when the relative speed is less than or equal to a specified speed. With regard to the relative speed, a speed from which pedestrians and oncoming vehicles are excluded is specified.

Next, when recognizing the movable body present in the vicinity of the host vehicle as a vehicle, the preceding vehicle identifying section 221 obtains information that shows the distance between the host vehicle and the preceding vehicle from, for example, the millimeter wave radar 112.

The vehicle-to-vehicle distance control section 222 performs computation and control in order to maintain the distance between the assistance target vehicle and a preceding vehicle at a distance greater than or equal to a specified distance. The vehicle-to-vehicle distance control section 222 has information on the specified vehicle-to-vehicle distance, for example, for each traveling speed of the assistance target vehicle. Upon input of information that shows the relative speed and a relative position of a preceding vehicle, the vehicle-to-vehicle distance control section 222 obtains information that shows a traveling speed of a vehicle from the vehicle state obtaining section 100. Next, the vehicle-to-vehicle distance control section 222 determines a vehicle-to-vehicle distance to be maintained based on the information on the relative speed and the relative position of the preceding vehicle, the traveling speed of the host vehicle, and the vehicle-to-vehicle distance. Thereafter, the vehicle-to-vehicle distance control section 222 compares the thus determined vehicle-to-vehicle distance with the distance between the host vehicle and the preceding vehicle.

According to the comparison result, when an actual distance the host vehicle and the preceding vehicle, is longer than the thus determined vehicle-to-vehicle distance, the vehicle-to-vehicle distance control section 222 calculates a control amount for accelerating the host vehicle until arrival at the thus determined vehicle-to-vehicle distance. The vehicle-to-vehicle distance control section 222 outputs acceleration information, which shows the thus calculated control amount, to an on-vehicle engine control device 420, which controls the engine of the host vehicle via the assistance arbitration section 300 for arbitration of driving assistance. Next, when the distance between the host vehicle and the preceding vehicle, reaches the thus determined vehicle-to-vehicle distance by the acceleration of the host vehicle, the vehicle-to-vehicle distance control section 222 performs such control that the traveling speed of the preceding vehicle is followed by the traveling speed of the host vehicle. That is, the vehicle-to-vehicle distance control section 222 performs acceleration assistance for accelerating the host vehicle so that the host vehicle comes closer to the preceding vehicle up to the thus determined vehicle-to-vehicle distance.

On the other hand, when the actual distance between the host vehicle and the preceding vehicle, is shorter than the determined vehicle-to-vehicle distance based on the comparison result, the vehicle-to-vehicle distance control section 222 calculates a control amount for deceleration the host vehicle until the determined vehicle-to-vehicle distance is ensured. The vehicle-to-vehicle distance control section 222 outputs the deceleration information, which shows the calculated control amount, to the intervention control device 410, which applies braking to decelerate the host vehicle via the assistance arbitration section 300. Moreover, when the distance between the host vehicle and the preceding vehicle is ensured to the thus determined vehicle-to-vehicle distance by the braking for deceleration the host vehicle, the vehicle-to-vehicle distance control section 222 performs such control that the traveling speed of the preceding vehicle is followed by the traveling speed of the host vehicle.

The constant speed travel assisting section 230 performs computation and control so that the speed of the assistance target vehicle is maintained at a set speed that has been set. The set speed is set by, for example, the driver of the host vehicle. When the set speed is set, the constant speed travel assisting section 230 obtains information that shows the traveling speed of the host vehicle from the vehicle speed sensor 105 of the vehicle state obtaining section 100, for example.

When the traveling speed of the host vehicle is slower than the set speed, the constant speed travel assisting section 230 calculates a control amount in order to accelerate the host vehicle until arrival at the set speed. The constant speed travel assisting section 230 outputs acceleration information, which shows the calculated control amount, to the engine control device 420, which controls the engine of the host vehicle via the assistance arbitration section 300. Thereby, the constant speed travel assisting section 230 performs control so that the traveling speed of the host vehicle can reach the set speed. That is, the constant speed travel assisting section 230 performs acceleration assistance for accelerating the host vehicle. When the host vehicle is accelerated and the traveling speed of the host vehicle then reaches the set speed, the constant speed travel assisting section 230 performs such control that the traveling speed of the host vehicle is maintained at the set speed.

On the other hand, when the traveling speed of the host vehicle is greater than the set speed, the constant speed travel assisting section 230 calculates a control amount in order to decelerate the host vehicle until arrival at the set speed. The constant speed travel assisting section 230 outputs deceleration information, which shows the calculated control amount, to the engine control device 420, which controls the engine of the host vehicle via the assistance arbitration section 300. Thereby, the constant speed travel assisting section 230 performs such control that the traveling speed of the host vehicle is given as the set speed. That is, the constant speed travel assisting section 230 performs deceleration assistance in reducing the speed of the host vehicle. When the host vehicle is decelerated and the traveling speed of the host vehicle then reaches the set speed, the constant speed travel assisting section 230 performs such control that the traveling speed of the host vehicle is maintained at the set speed.

The assistance arbitration section 300 of the present embodiment performs an arbitration process, which arbitrates deceleration assistance, which is braking based on intervention control information output by the avoidance control section 214 of the collision avoidance assisting section 210, and acceleration assistance by the vehicle-to-vehicle distance assisting section 220 or the constant speed travel assisting section 230. That is, the assistance arbitration section 300 of the present embodiment is to arbitrate acceleration assistance and deceleration assistance, which assist respectively acceleration and deceleration, which are conflicting with each other.

Further, the assistance arbitration section 300 of the present embodiment is provided with a timing changing section 310, which arbitrates different types of driving assistance by changing time at which two or more conflicting types of driving assistance are performed. The timing changing section 310 monitors whether braking is applied to a vehicle based on the intervention control information input from the avoidance control section 214 of the collision avoidance assisting section 210. Further, the timing changing section 310 measures time elapsed from termination of previous braking based on the intervention control information.

Further, the timing changing section 310 determines whether the information input from the vehicle-to-vehicle distance control section 222 and the constant speed travel assisting section 230 is deceleration information for controlling the host vehicle to decelerate or acceleration information for controlling the host vehicle to accelerate. Then, upon determination that the acceleration information is input, the timing changing section 310 determines whether braking is applied to the host vehicle by the avoidance control section 214.

Upon determination that the acceleration information is input and braking is also applied to the host vehicle by the avoidance control section 214, the timing changing section 310 performs a delay process in which time of activating the acceleration control by the vehicle-to-vehicle distance control section 222 or the constant speed travel assisting section 230 is delayed only by a specified period of time, which has been specified in advance. The specified period of time includes, for example, a period of time which is specified to such an extent that a typical driver will not feel annoyance or a sense of discomfort due to acceleration by the acceleration control after deceleration due to braking applied to a vehicle. The specified period of time is specified based on data obtained from, for example, driving results of multiple drivers.

The timing changing section 310 also performs a similar delay process when the time of input of acceleration information is such time at which a specified period of time has not elapsed after termination of the previous braking applied to the host vehicle by the avoidance control section 214.

The timing changing section 310 performs a process for outputting the acceleration information to the engine control device 420 as a delay process after the lapse of a specified period of time. Accordingly, the acceleration information is input to the engine control device 420 after the lapse of only the specified period of time from the time at which the vehicle-to-vehicle distance assisting section 220 or the constant speed travel assisting section 230 outputs the acceleration information. Then, the engine control device 420 controls the engine, etc., in accordance with the acceleration information, by which after the lapse of the specified period of time from the braking applied by the avoidance control section 214, the acceleration control for maintenance of a vehicle-to-vehicle distance and constant speed traveling is performed. Thereby, it is possible to suppress simultaneous performance of braking and acceleration control on collision avoiding assistance and also to suppress repeated performance within a short period of time.

The HMI 400 is configured by, for example, an audio device, a head-up display, the monitor of a navigation system, an instrument panel, and the like. Upon input of a warning instructing signal from the avoidance control section 214, the HMI 400 gives warning to the driver, for example, the presence of a person or a vehicle ahead in the advancing direction and displays a warning message on the head-up display or the like.

The intervention control device 410 is configured by, for example, various types of control devices such as a brake control device for controlling a brake actuator of a vehicle and a steering control device for controlling a steering actuator. Upon input of intervention control information from the avoidance control section 214, the intervention control device 410 controls the brake control device, etc., based on the intervention control information. Accordingly, a vehicle is reduced in traveling speed, by which a relative position Po between the first time TTC and the second time TTV is changed to result in passage of a movable body through the meeting point Po before the vehicle reaches a meeting point. That is, near collision between the vehicle and the movable body is suppressed.

When the acceleration information output by the vehicle-to-vehicle distance assisting section 220 or the constant speed travel assisting section 230 is input via the assistance arbitration section 300, the engine control device 420 performs such control that an engine is increased in rotation in accordance with the acceleration information. Thereby, the vehicle is increased in traveling speed in accordance with the acceleration information.

Next, operation of the driving assistance apparatus and the driving assistance method of the present embodiment will be described with reference to FIGS. 5 to 8.

Figure 5:
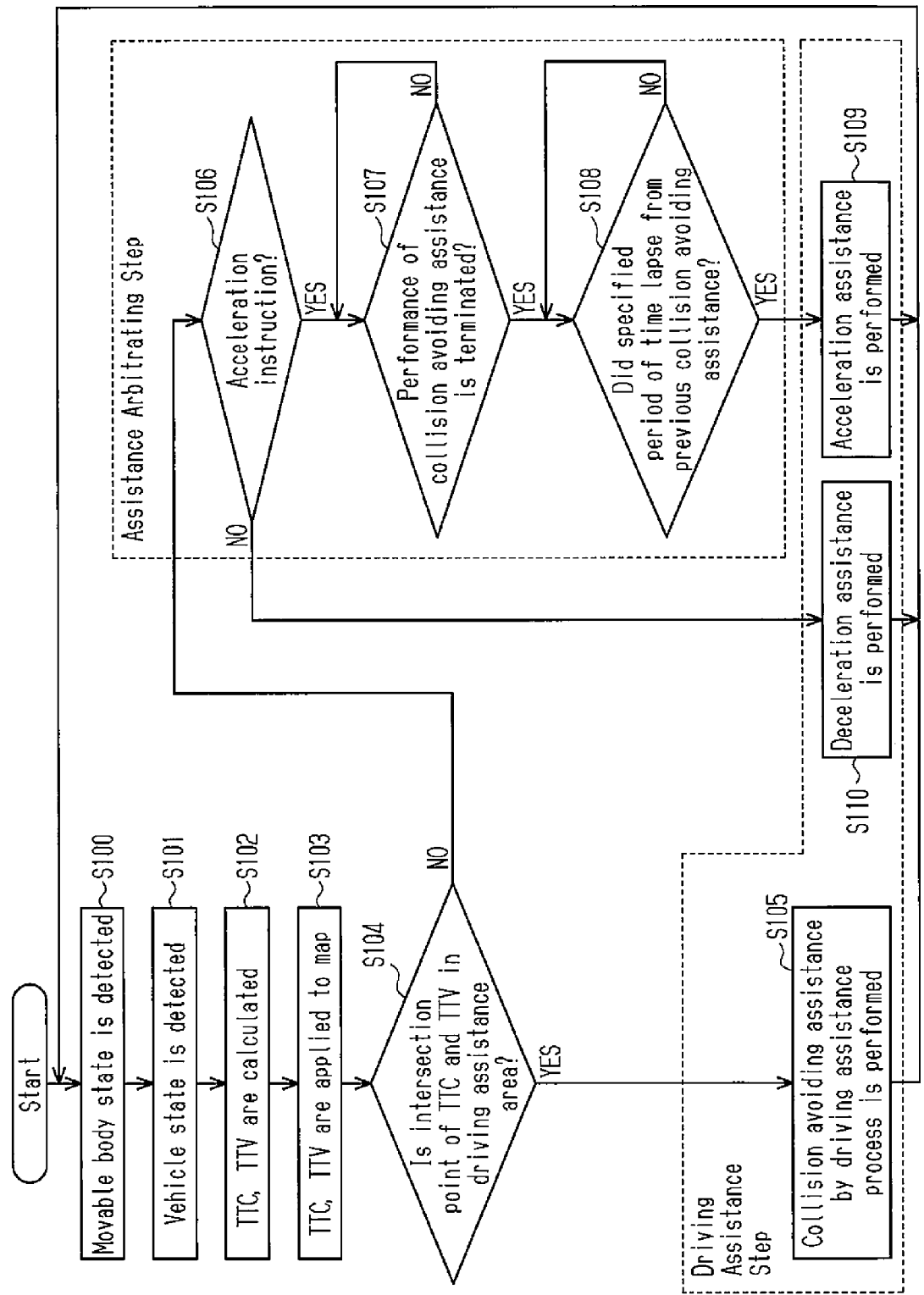
FIG. 5 is a flowchart showing one example of an arbitration process in this embodiment.

As shown in FIG. 5, first, in Step S100, upon detection of a movable body such as a pedestrian present or a vehicle in the vicinity of the host vehicle, the position of the movable body, the advancing direction thereof, and the moving speed thereof, that is, the velocity vector are detected.

Next, upon detection of the position, the advancing direction, and the moving speed the host vehicle, the first time TTC and the second time TTV are calculated (Steps S101, S102). Next, the thus calculated first time TTC and the second time TTV are applied on the map M to identify a position at which the first time TTC intersects the second time TTV, that is, the relative relationship between the first time TTC and the second time TTV (Step S103).

When the intersection point of the first time TTC and the second time TTV is identified, the position thereof is determined whether it belongs to the assistance region A2 (Step S104). When the intersection point of the first time TTC and the second time TTV is within a range of the assistance region A2 (Step S104: YES), collision avoiding assistance is performed by the collision avoidance assisting section 210 via a driving assistance process (Step S105). Then, in Step S100, detection is again made for a movable body present in the vicinity of the assistance target vehicle.

On the other hand, in Step S104, when it is determined that the intersection point of the first time TTC and the second time TTV does not belong to the assistance region A2, no collision avoiding assistance is performed on the grounds that the assistance target vehicle is unlikely to collide with a movable body present in the vicinity thereof (Step S104: NO).

Next, it is determined whether the vehicle-to-vehicle distance assisting section 220 or the constant speed travel assisting section 230 has output the acceleration information for accelerating a vehicle, upon performance of vehicle-to-vehicle distance assistance or constant speed traveling assistance (Step S106). In this case, upon confirmation that the assistance arbitration section 300 has obtained the acceleration information output by the vehicle-to-vehicle distance assisting section 220 or the constant speed travel assisting section 230, it is detected that a request for activating acceleration assistance has been made from the vehicle-to-vehicle distance assisting section 220 or the constant speed travel assisting section 230.

When the request for activating acceleration assistance is made (Step S106: YES), it is determined whether the collision avoiding assistance performed in Step S105 is terminated (Step S107). Next, upon termination of the collision avoiding assistance (Step S107: YES), it is determined whether a specified period of time has elapsed from the time point of termination (Step S108). Next, on the condition that the specified period of time has elapsed from termination of the collision avoiding assistance, activation of the acceleration assistance is permitted and the acceleration assistance based on the acceleration information is performed (Step S109). As a result, when it is found that acceleration information is output from the vehicle-to-vehicle distance assisting section 220, the assistance target vehicle is accelerated so that the distance between the assistance target vehicle and a preceding vehicle, is decreased to a specified vehicle-to-vehicle distance. Further, when the acceleration information is output from the constant speed travel assisting section 230, the assistance target vehicle is accelerated so that the traveling speed of the assistance target vehicle reaches a set speed.

On the other hand, at Step S107, the collision avoiding assistance is determined to be in progress (Step S107: NO), activation of the acceleration assistance is suspended until termination of the collision avoiding assistance and the lapse of a specified period of time, (Step S108). Next, upon confirmation of the lapse of the specified period of time, activation of the acceleration assistance is permitted (Step S109).

Further, at Step S108 it is determined that a specified period of time has not elapsed from termination of the collision avoiding assistance (Step S108: NO), activation of the acceleration assistance is suspended until the lapse of the specified period of time. Next, upon confirmation of the lapse of the specified period of time, activation of the acceleration assistance is permitted (Step S109).

Further, at Step S106, it is determined that the information input from the vehicle-to-vehicle distance assisting section 220 or the constant speed travel assisting section 230 is deceleration information, deceleration assistance in accordance with the deceleration information is performed (Step S106: NO, S110).

In the present embodiment, Step S105, Step S109 and Step S110 in FIG. 5 correspond to the driving assistance step. Further, Step S106 to Step S108 correspond to the assistance arbitrating step.

Next, a detailed description will be given of procedures of collision avoiding assistance by the driving assistance process of Step S105 in FIG. 5 with reference to FIG. 6.

Figure 6:
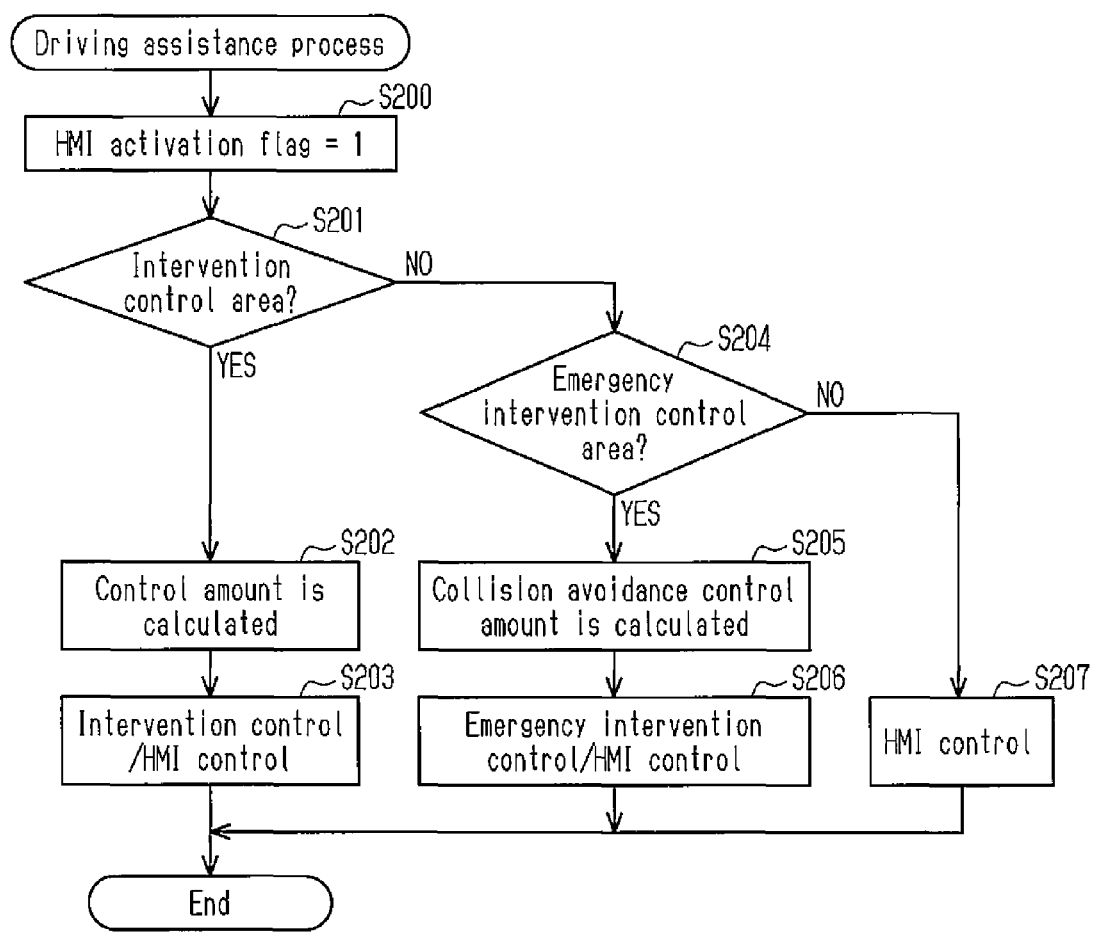
FIG. 6 is a flowchart showing one example of a driving assistance process by a collision avoidance assisting section.

As shown in FIG. 6, first, since the intersection point of the first time TTC and the second time TTV belongs to the assistance region A2 on performance of this process, a HMI activation flag for activating the HMI 400 is set to be 1 (Step S200).

Next, it is determined whether the intersection point of the first time TTC and the second time TTV belongs to the intervention control area A22 in the assistance region A2 (Step S201). When the intersection point of the first time TTC and the second time TTV belongs to the intervention control area A22 (Step S201: YES), a control amount of intervention control is calculated based on, for example, the map M (Step S202). Next, based on the thus calculated control amount, intervention control by the intervention control device 410 and warning by the HMI 400 are performed (Step S203). Thereby, braking is applied to a vehicle moving to a movable body, and a warning is given to the driver of the vehicle. The warning given to the driver of the vehicle includes deceleration guidance.

On the other hand, in Step S201, when the intersection point of the first time TTC and the second time TTV is determined not to belong to the intervention control area A22 in the assistance region A2, it is determined whether the intersection point belongs to the emergency intervention control area A23 (Step S204).

When the intersection point of the first time TTC and the second time TTV belongs to the emergency intervention control area A23 (Step S204: YES), a collision avoidance control amount, which is a control amount for urgently avoiding collision between the vehicle and a movable body, is calculated (Step S205). Next, based on the calculated collision avoidance control amount, emergency intervention control is performed by the intervention control device 410 and warning is given by the HMI 400 (Step S206). Thereby, hard braking is applied to the vehicle moving toward a movable body and warning is given to the driver of the vehicle. Warning to the driver of the vehicle includes guidance of sudden deceleration and guidance of steering operation for avoiding collision. Further, in most cases, by the time when the intersection point of the first time TTC and the second time TTV reaches the emergency intervention control area A23, the intersection point belongs to the HMI area A21 or the intervention control area A22. Therefore, ordinarily, prior to activation of hard braking, deceleration guidance is provided by the HMI 400 and braking is applied by the intervention control device 410. It is, thereby, possible to prevent the intersection point of the first time TTC and the second time TTV from belonging to the emergency intervention control area A23.

Further, on the other hand, at Step S204, the intersection point of the first time TTC and the second time TTV is determined not to belong to the emergency intervention control area A23 (Step S204: NO), the intersection point belongs to the HMI area A21. Accordingly, at this time, only HMI control is performed, and deceleration guidance and guidance for notifying the presence of a movable body are provided (Step S205).

Next, with reference to FIGS. 7 and 8, a description will be given of changes in the first time TTC and the second time TTV in the vehicle which is arbitrated via an arbitration process by the driving assistance apparatus and the driving assistance method of the present embodiment based on comparison with a comparative example.

Figure 7:
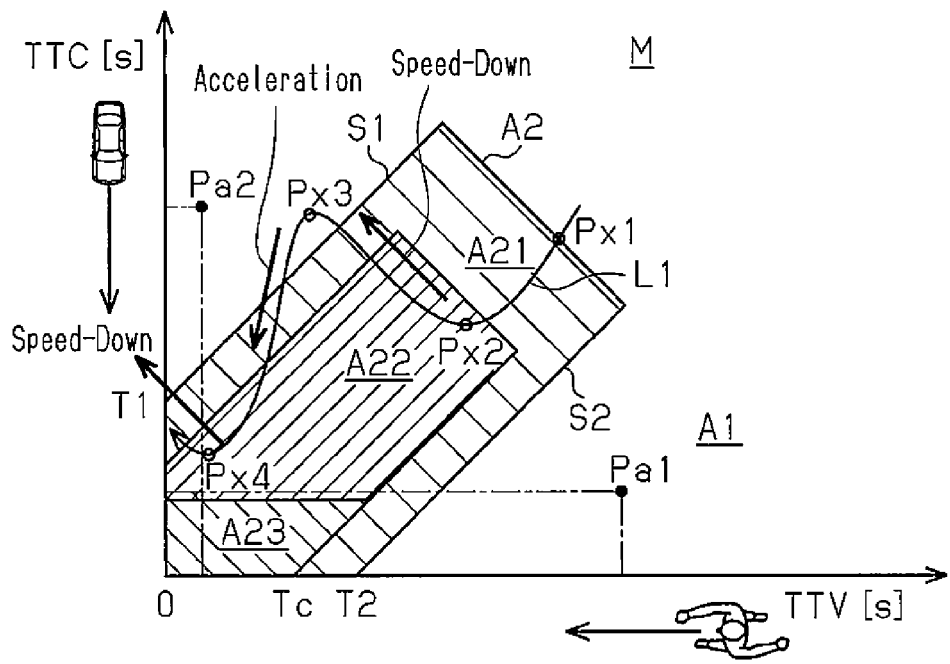
FIG. 7 is a drawing showing, as a comparative example, an example of changes in the first time and the second time when no arbitration is made.

As FIG. 7 shows a change L1 of the first time TTC and the second time TTV when no arbitration process is performed, the first time TTC and the second time TTV are found to belong to the assistance region A2 at a certain point Px1, by which collision avoiding assistance is performed. As a result, the assistance target vehicle is decelerated. Then, the change L1 of the first time TTC and the second time TTV moves from a point Px2 to a point Px3, which is positioned on a boundary line with the non-assistance region A1, thereby exiting the assistance region A2. That is, there is a greater time difference between arrival of the vehicle of an assistance target at a meeting point and arrival of a movable body present in the vicinity thereof at the meeting point.

On the other hand, acceleration assistance is performed by vehicle-to-vehicle distance control and constant speed traveling control before the lapse of a specified period of time from termination of collision avoiding assistance based on the fact that the first time TTC and the second time TTV have exited the assistance region A2. Thereby, the change L1 moves from the point Px3 to a point Px4, which positions at the emergency intervention control area A23. As a result, the first time TTC and the second time TTV, which temporarily exit the assistance region A2 again belong to the assistance region A2. Thereafter, another performance of the collision avoiding assistance allows the change L1 of the first time TTC and the second time TTV to move from the point Px4 in such a manner as to exit the assistance region A2.

As described above, in the comparative example in which no arbitration process is performed, deceleration of the vehicle by collision avoiding assistance and acceleration of the vehicle by acceleration assistance are repeatedly performed.

Figure 8:
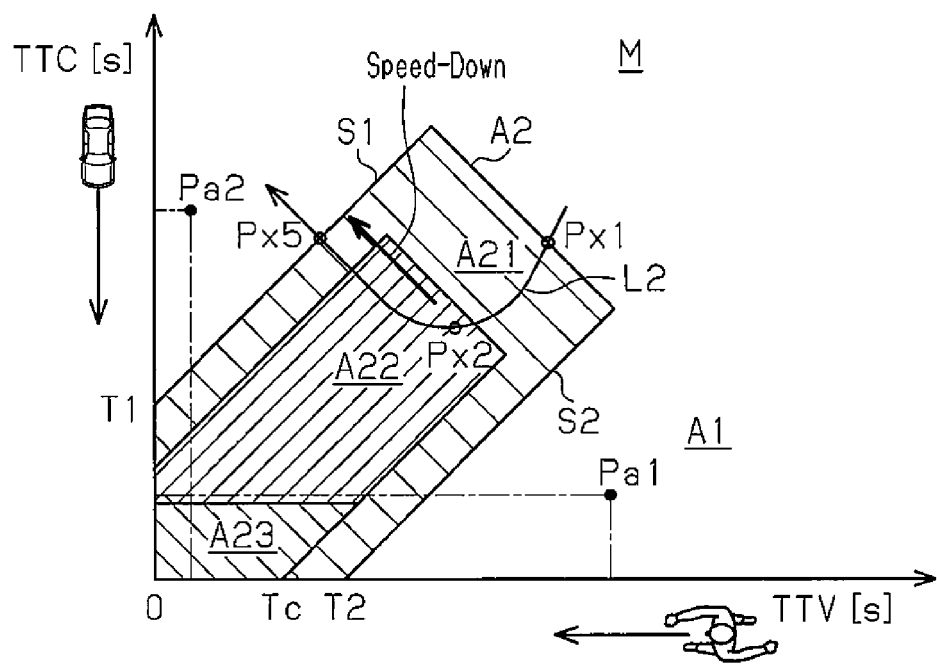
FIG. 8 is a drawing showing an example of changes in the first time and the second time when arbitration is made.

In contrast, with regard to a change L2 shown in FIG. 8, in the present embodiment, collision avoiding assistance is performed when the first time TTC and the second time TTV belong to the assistance region A2 at the certain point Px1. As a result, the assistance target vehicle is decelerated. Next, the change L2 of the first time TTC and the second time TTV moves from the point Px2 to a point Px5 on a straight line S1, exiting the assistance region A2.

Then, in the present embodiment, even after termination of the collision avoiding assistance due to the fact that the first time TTC and the second time TTV have exited from the assistance region A2 at the point Px5, time of activating acceleration assistance is delayed by the timing changing section 310. As a result, until the lapse of a specified period of time from termination of the collision avoiding assistance, activation of the acceleration assistance is suppressed. Then, upon lapse of the specified period of time, activation of the acceleration assistance is permitted and the vehicle-to-vehicle distance is controlled by the vehicle-to-vehicle distance assisting section 220 and constant speed traveling control is performed by the constant speed travel assisting section 230.

As described so far, according to the driving assistance apparatus and the driving assistance method of the present embodiment, the following advantages are obtained.

(1) The driving assisting section 200 performs different types of driving assistance by means of a plurality of assistance elements. Further, when the driving assisting section 200 performs at least two types of driving assistance based on the assistance elements within a specified period of time, the assistance arbitration section 300 arbitrates at least two types of driving assistance. Interference between individual types of driving assistance performed by the driving assisting section 200 and repeated performance of the types of driving assistance within a specified period of time are suppressed. Thereby, even a vehicle in which various types of driving assistance are performed is able to maintain appropriateness of each type of driving assistance.

(2) The assistance arbitration section 300 detects whether a request for activating driving assistance based on the vehicle-to-vehicle distance assisting section 220 or the constant speed travel assisting section 230, which forms a second assistance element, is made during performance of driving assistance based on the collision avoidance assisting section 210, which forms a first assistance element. Then, upon detection of the request for activation thereof, the assistance arbitration section 300 delays time at which the driving assistance is activated by the vehicle-to-vehicle distance assisting section 220 or the constant speed travel assisting section 230. Therefore, it is possible to suppress performance of driving assistance based on the collision avoidance assisting section 210 and driving assistance based on the vehicle-to-vehicle distance assisting section 220 and the constant speed travel assisting section 230 within a specified period of time. Further, the assistance arbitration section 300 permits activation of driving assistance based on the vehicle-to-vehicle distance assisting section 220 and the constant speed travel assisting section 230, each of which is suspended from activation, after the lapse of a specified period of time from termination of the driving assistance based on the collision avoidance assisting section 210. Thereby, it is possible to ensure the advantages of the driving assistance performed by the vehicle-to-vehicle distance assisting section 220 and the constant speed travel assisting section 230. Further, the assistance arbitration section 300 determines whether the time of making a request for activating driving assistance based on the vehicle-to-vehicle distance assisting section 220 or the constant speed travel assisting section 230 is after the lapse of a specified period of time from termination of performance of the driving assistance based on the collision avoidance assisting section 210. Then, upon determination that the time is before the lapse of the specified period of time, the assistance arbitration section 300 performs a delay process in which activation of driving assistance by the vehicle-to-vehicle distance assisting section 220 and the constant speed travel assisting section 230 is delayed until the lapse of the specified period of time. Therefore, it is possible to suppress performance of driving assistance based on the collision avoidance assisting section 210 and performance of driving assistance based on the vehicle-to-vehicle distance assisting section 220 and the constant speed travel assisting section 230 within the specified period of time. Further, the assistance arbitration section 300 permits activation of driving assistance based on the vehicle-to-vehicle distance assisting section 220 and the constant speed travel assisting section 230, each of which is suspended from activation, after the lapse of the specified period of time from termination of driving assistance based on the collision avoidance assisting section 210. Thereby, it is also possible to ensure the advantages of driving assistance performed by the vehicle-to-vehicle distance assisting section 220 and the constant speed travel assisting section 230.

(3) The assistance arbitration section 300 arbitrates, as targets of arbitration, different types of driving assistance in a conflicting assistance mode. It is, thus, possible to maintain appropriateness of each type of driving assistance in a conflicting assistance mode and also maintain assistance advantages by each type of driving assistance.

(4) The assistance arbitration section 300 arbitrates, as targets of arbitration, acceleration assistance, which assists in acceleration of the assistance target vehicle, and deceleration assistance, which assists in deceleration of the speed of the assistance target vehicle, as the different types of driving assistance in a conflicting assistance mode. Therefore, the acceleration assistance and the deceleration assistance, each of which greatly influences a state of the vehicle, are arbitrated, by which the acceleration assistance and the deceleration assistance are performed smoothly. Thereby, acceleration of the vehicle by the acceleration assistance and deceleration of the vehicle by the deceleration assistance are smoothly performed to ensure the advantages of each type of driving assistance. Accordingly, a sense of discomfort experienced by the driver is suppressed to give a minimum extent even in a vehicle in which acceleration assistance and deceleration assistance, which are conflicting with each other are performed.

(5) The driving assisting section 200 is provided, as assistance elements, with the vehicle-to-vehicle distance assisting section 220, which assists in controlling the distance between the assistance target vehicle and a preceding vehicle, which travels ahead of the vehicle in a advancing direction, and the constant speed travel assisting section 230 which assists the constant speed traveling of the assistance target vehicle. The driving assisting section 200 is also provided with the collision avoidance assisting section 210, which assists in avoidance of collision between the vehicle of the assistance element and a physical object present in the vicinity of the assistance target vehicle. Moreover, the assistance arbitration section 300 arbitrates driving assistance by the collision avoidance assisting section 210, the vehicle-to-vehicle distance assisting section 220 and the constant speed travel assisting section 230. Thereby, it is possible to smoothly realize maintenance of the distance between the assistance target vehicle and the preceding vehicle, constant speed traveling of the assistance target vehicle, and collision avoidance between the assistance target vehicle and a physical object.

(6) Based on a relationship between the first time TTC taken by a vehicle of an assistance target to reach a meeting point Po of a movement path of the vehicle and a movement path of a movable body and the second time TTV taken by the movable body to reach the meeting point Po, the collision avoidance assisting section 210 performs assistance in avoidance of collision between the vehicle and the movable body. Thereby, it is more likely to suppress near collision between the vehicle and the movable body by slowly deceleration without requesting hard braking, abrupt braking operation or the like. Therefore, driving assistance can be performed smoothly. Further, the assistance arbitration section 300 arbitrates, as targets of arbitration, deceleration assistance for assisting in avoidance of collision between the assistance target vehicle and a physical object by the collision avoidance assisting section 210 and acceleration assistance for giving acceleration control to the assistance target vehicle by the vehicle-to-vehicle distance assisting section 220 and the constant speed travel assisting section 230. Thus, there is no chance that assistance in prompting deceleration and acceleration will be alternately performed due to interference between various types of assistance. It is, thereby, possible to give to one vehicle each of the functions of collision avoiding assistance, vehicle-to-vehicle distance assistance and constant speed traveling assistance, with these functions of assistance maintained.

(7) On the condition that the first time TTC and the second time TTV are less than or equal to a specified threshold value, the collision avoidance assisting section 210 performs collision avoiding assistance. That is, when the intersection point of the first time TTC and the second time TTV belongs to the assistance region A2, the collision avoidance assisting section 210 performs the collision avoiding assistance. The assistance arbitration section 300 performs a process for suppressing activation of acceleration assistance by the vehicle-to-vehicle distance assisting section 220 and the constant speed travel assisting section 230, while each of the first time TTC and the second time TTV is less than or equal to a threshold value, that is, during a period of time in which they belong to the assistance region A2. Therefore, it is possible to properly suppress the vehicle from being prompted to accelerate by acceleration assistance in the course of performing the collision avoiding assistance.

(8) The collision avoidance assisting section 210 is provided with the map storage section 213, which records the map M in which the assistance region A2 for performing driving assistance and the non-assistance region A1 for performing no driving assistance are specified for a relative relationship between the first time TTC and the second time TTV. Then, the collision avoidance assisting section 210 performs the collision avoiding assistance with reference to the map M. Therefore, the collision avoidance assisting section 210 is able to determine whether activation of the collision avoiding assistance is needed based whether the intersection point of the first time TTC and the second time TTV based on a vehicle of an assistance target and a movable body present in the vicinity thereof belongs to the assistance region A2 or the non-assistance region A1 in the map M. Thereby, it is possible to easily determine whether activation of the collision avoiding assistance is needed.

(9) The assistance region A2 of the map M is divided into the HMI area A21, the intervention control area A22 and the emergency intervention control area A23 in accordance with urgency. Further, the driving assisting section 200 performs different types of driving assistance based whether a relative relationship between the first time TTC and the second time TTV of the assistance target vehicle belongs the HMI area A21, the intervention control area A22, or the emergency intervention control area A23. Accordingly, driving assistance is set in accordance with the urgency of each of the thus divided areas, by which driving assistance of such a level, that is, in accordance with a relative positional relationship between the assistance target vehicle and a movable body is performed. It is, thereby, possible to perform appropriateness of activation of the driving assistance in accordance with each level.

Second Embodiment

Figure 9:
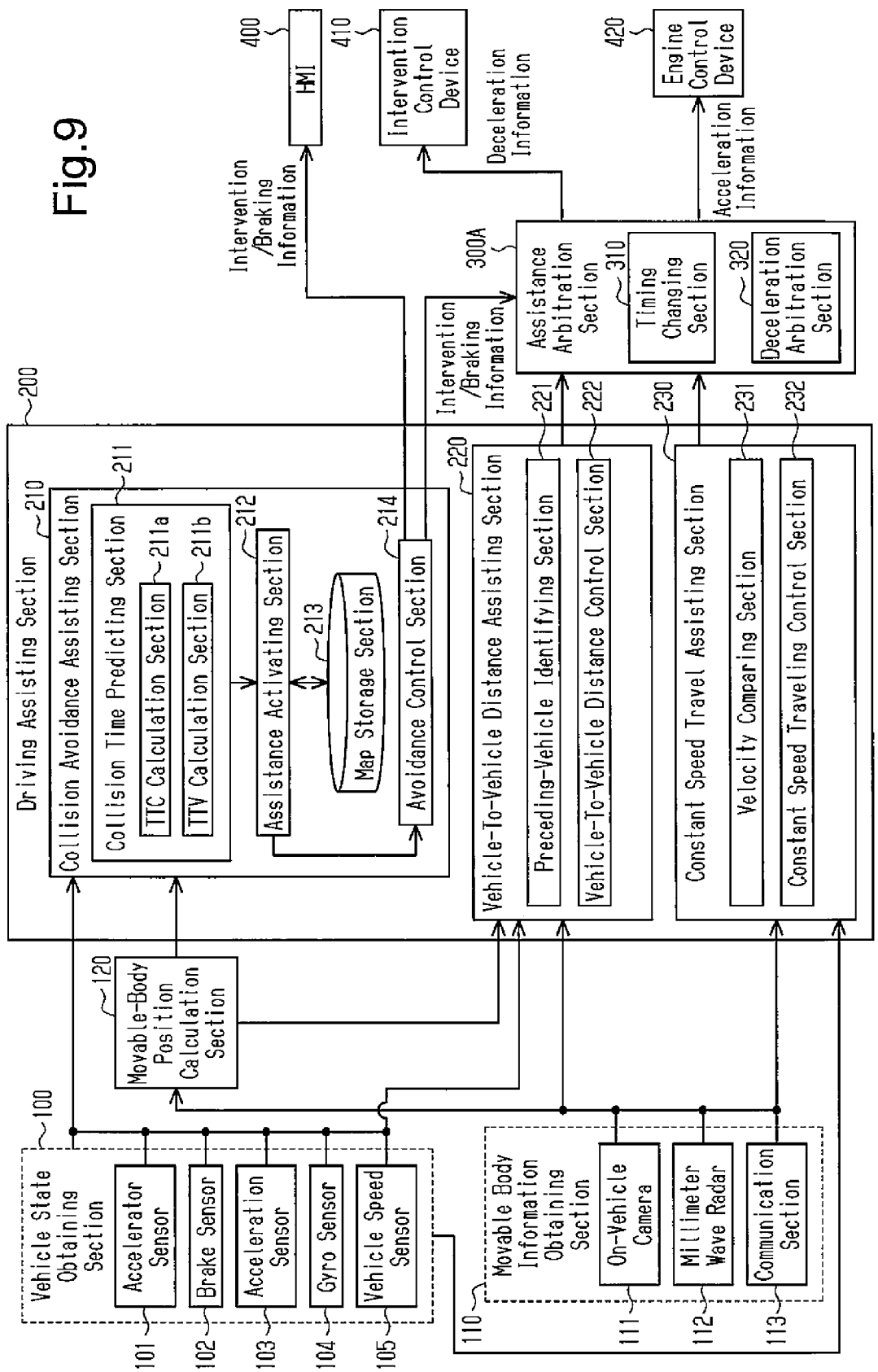
FIG. 9 is a block diagram showing a schematic configuration of a vehicle to which a driving assistance apparatus and a driving assistance method of a second embodiment are applied.
Figure 10:
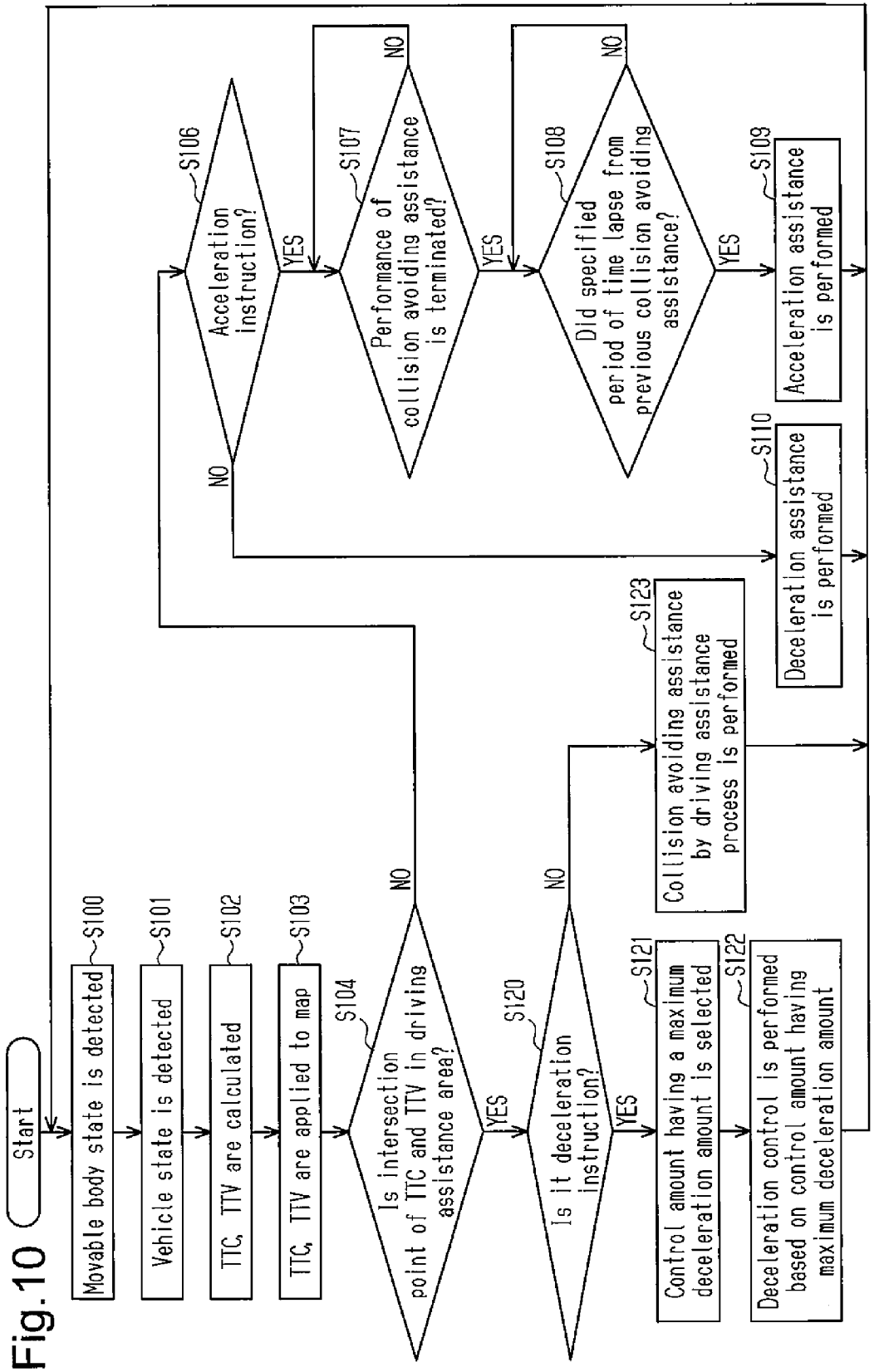
FIG. 10 is a flowchart showing one example of an arbitration process in this embodiment.

Next, a driving assistance apparatus and a driving assistance method according to a second embodiment of the present invention will be described with reference to FIGS. 9 and 10, with an emphasis given to differences from the first embodiment. The driving assistance apparatus and the driving assistance method according to the present embodiment are also similar in basic configuration to those of the first embodiment. In FIGS. 9 and 10, elements substantially the same as those of the first embodiment will be given the same reference numerals, with a redundant description omitted.

As shown in FIG. 9, in the present embodiment, an avoidance control section 214, which forms a collision avoidance assisting section 210, outputs intervention control information to be output to an intervention control device 410 to the intervention control device 410 via an on-vehicle assistance arbitration section 300A.

The assistance arbitration section 300A of the present embodiment is also provided with a deceleration arbitration section 320 which arbitrates braking applied via the intervention control device 410, that is, deceleration assistance.

The deceleration arbitration section 320 performs an arbitration process for arbitrating the deceleration assistance performed based on intervention control information input from the collision avoidance assisting section 210, deceleration information input from a vehicle-to-vehicle distance assisting section 220 and deceleration information input from a constant speed travel assisting section 230.

When information on the other deceleration assistances is input during performance of deceleration assistance based on information input from any one of the collision avoidance assisting section 210, the vehicle-to-vehicle distance assisting section 220 and the constant speed travel assisting section 230, the deceleration arbitration section 320 compares each of control amounts shown by the information. Then, the deceleration arbitration section 320 selects information having a greater control amount and outputs only the thus selected information to the intervention control device 410.

When intervention/control information from the collision avoidance assisting section 210 is input at the same time with deceleration information from the vehicle-to-vehicle distance assisting section 220 or the constant speed travel assisting section 230, the deceleration arbitration section 320 also selects information having a greater control amount and outputs only the thus selected information to the intervention control device 410. In a similar manner, when the deceleration information is input at the same time from each of the vehicle-to-vehicle distance assisting section 220 and the constant speed travel assisting section 230, the deceleration arbitration section 320 also selects information having a greater control amount and outputs only the thus selected information to the intervention control device 410.

The intervention control device 410 performs braking in accordance with a control amount shown by one intervention/control information or deceleration information input from the deceleration arbitration section 320. As a result, deceleration assistance is performed based on information arbitrated by the deceleration arbitration section 320.

Hereinafter, operation of the driving assistance apparatus and the driving assistance method of the present embodiment will be described with reference to FIG. 10.

As shown in FIG. 10, in the present embodiment, the same process as that previously given in Step S100 to Step S103 of FIG. 5 is performed, and it is determined whether an intersection point of first time TTC and second time TTV is within a range of an assistance region A2 (Step S104). When the intersection point of the first time TTC and the second time TTV is determined to be within the range of the assistance region A2 (Step S104: YES), it is determined whether deceleration information is output from the vehicle-to-vehicle distance assisting section 220 or the constant speed travel assisting section 230, that is, a request for activating the deceleration assistance is made (Step S120).

When the request for activating the deceleration assistance is made (Step S120: YES), information having a maximum control amount of the deceleration amounts from the deceleration information output from the vehicle-to-vehicle distance assisting section 220 or the constant speed travel assisting section 230 and the intervention/control information output from the collision avoidance assisting section 210 is selected (Step S121). Next, based on the thus selected control amount, the vehicle is decelerated by the intervention control device 410 (Step S122). As a result, when the request for activating the deceleration assistance is made by the vehicle-to-vehicle distance assisting section 220 or the constant speed travel assisting section 230 in the course of performance of collision avoiding assistance by the collision avoidance assisting section 210, one type of assistance having a maximum deceleration amount of the control amounts among various types of assistance is performed. That is, when a deceleration amount of the collision avoiding assistance is greater than a deceleration amount of the vehicle-to-vehicle distance assistance or the constant speed traveling assistance, the collision avoiding assistance is performed. On the other hand, when a deceleration amount of the vehicle-to-vehicle distance assistance or the constant speed traveling assistance is greater than a deceleration amount of the collision avoiding assistance, the vehicle-to-vehicle distance assistance or the constant speed traveling assistance is performed.

Further, when a request for activating the deceleration assistance is made by the vehicle-to-vehicle distance assisting section 220 or the constant speed travel assisting section 230 at the start of performing the collision avoiding assistance by the collision avoidance assisting section 210, one type of assistance having a maximum control amount of the deceleration amounts of various types of assistance is performed.

On the other hand, when it is determined that no request for activating the deceleration assistance has been made by the vehicle-to-vehicle distance assisting section 220 or the constant speed travel assisting section 230 in Step S120, as previously described in Step S105 of FIG. 5, collision avoiding assistance is performed by a driving assistance process (Step S123).

As described so far, according to the driving assistance apparatus and the driving assistance method of the present embodiment, not only the above described advantages of (1) to (9) but also the following advantages are obtained.

(10) The assistance arbitration section 300A is provided with a deceleration arbitration section 320 for arbitrating deceleration assistance. The deceleration arbitration section 320 performs an arbitration process, which arbitrates deceleration assistance given based on intervention control information input from the collision avoidance assisting section 210, deceleration information input from the vehicle-to-vehicle distance assisting section 220 and deceleration information input from the constant speed travel assisting section 230. Therefore, when a request for activating the deceleration assistance is made by the vehicle-to-vehicle distance assisting section 220 or the constant speed travel assisting section 230 in the course of performance of collision avoiding assistance by the collision avoidance assisting section 210, the collision avoiding assistance and the vehicle-to-vehicle distance assistance or the constant speed traveling assistance are arbitrated. Therefore, it is possible to suppress assistance in deceleration of a vehicle that is performed continuously and repeatedly more than once and also to suppress unnecessary reduction in traveling speed of the vehicle. Further, when performance of collision avoiding assistance by the collision avoidance assisting section 210 overlaps in time with performance of deceleration assistance by the vehicle-to-vehicle distance assisting section 220 or the constant speed travel assisting section 230, the collision avoiding assistance and the vehicle-to-vehicle distance assistance or the constant speed traveling assistance are arbitrated. Therefore, it is possible to suppress plural pieces of information from being input simultaneously to the intervention control device 410. Moreover, the intervention control device 410 is able to perform smooth control based on one piece of information.

(11) When a request for activating a plurality of types of deceleration assistance is made, the deceleration arbitration section 320 selects information having a maximum deceleration amount and output the thus selected information to the intervention control device 410. Thereby, a deceleration amount requested in various types of assistance will be sufficiently met in view of any one of the collision avoiding assistance, the vehicle distance assistance and the constant speed traveling assistance.

Other Embodiments

The above described embodiments may be modified as follows.

Figure 11:
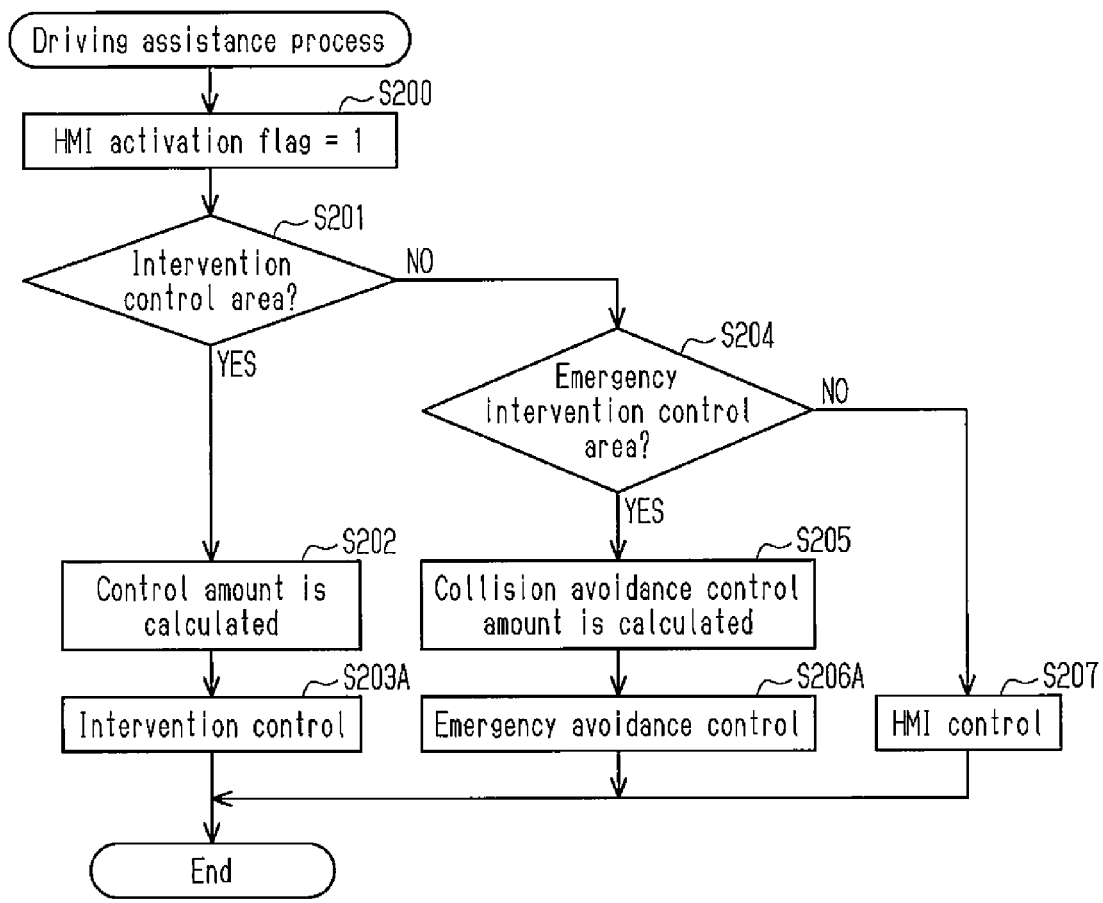
FIG. 11 is a flowchart showing one example of a driving assistance process by a collision avoidance assisting section according to a driving assistance apparatus and a driving assistance method of another embodiment of the present invention.

In each of the above-described embodiments, as shown in Steps S203, S206 of FIG. 6, HMI control by the HMI 400 is also performed upon performance of intervention control or emergency intervention control. In addition thereto, as shown in FIG. 11 as a drawing corresponding to FIG. 6, when conditions of performing the intervention control are met, only intervention control may be performed (Step S203A). Further, when conditions of performing the emergency intervention control are met, only emergency intervention control may be performed (Step S206A).

In each of the above-described embodiments, the vehicle state obtaining section 100 is configured by the accelerator sensor 101, the brake sensor 102, the acceleration sensor 103, the gyro sensor 104, and the vehicle speed sensor 105. In addition thereto, the vehicle state obtaining section 100 may be configured by at least any one of the accelerator sensor 101, the brake sensor 102, the acceleration sensor 103, the gyro sensor 104 and the vehicle speed sensor 105. Moreover, the first time TTC may be calculated by computation based on a detection result from at least one sensor. Further, the vehicle state obtaining section 100 may be configured by a GPS, which detects the latitude/longitude of the assistance target vehicle. Accordingly, based on the latitude/longitude of the vehicle detected by the GPS, the traveling speed of the vehicle is calculated to calculate the first time TTC. Moreover, the vehicle state obtaining section 100 may be such that it is able to obtain information that can be used in calculation of the first time TTC.

In each of the above-described embodiments, the movable body information obtaining section 110 is configured by the on-vehicle camera 111, the millimeter wave radar 112 and the communication apparatus 113. In addition thereto, the movable body information obtaining section 110 may be configured by at least any one of the on-vehicle camera 111, the millimeter wave radar 112 and the communication apparatus 113. In addition thereto, the movable body information obtaining section 110 may be configured by anything as long as it is able to obtain information on a movable body that can be used in calculation of the second time TTV.

In each of the above-described embodiments, the assistance region A2 of the map M, which is illustrated in FIGS. 3, 4, 7 and 8, is divided into three areas, that is, the HMI area A21, the intervention control area A22 and the emergency intervention control area A23. It is also acceptable that the assistance region A2 is divided into four or more areas and a driving assistance mode is set for each of the thus divided areas. Further, it is acceptable that the assistance region A2 is specified by one or two regions and various types of driving assistance modes are set for the thus specified regions. When the thus divided assistance region A2 is configured only by the HMI area A21, a configuration is made by omitting the above-described intervention control device 410. In contrast, when the divided assistance region A2 is configured only by the intervention control area A22 or the emergency intervention control area A23, a configuration is made by omitting the above-described HMI 400. Any given driving assistance mode may be set in the assistance region A2 and can be changed, whenever necessary.

In each of the above-described embodiments, collision avoiding assistance is performed based on the map M stored at the map storage section 213. In addition thereto, any collision avoiding assistance may be performed as long as it is performed based on a relative relationship between the first time TTC and the second time TTV. Moreover, a condition of activating the collision avoiding assistance may be determined by whether a value of each of the first time TTC and the second time TTV corresponds to a specified value.

In the second embodiment, which has been described above, when a request for activating a plurality of types of deceleration assistance is made, information having a maximum deceleration amount is selected. Moreover, the deceleration assistance is given to the vehicle based on the thus selected information. In contrast, there may be selected information other than the information having a maximum deceleration amount when the request for activating the types of deceleration assistance is made. Thereby, it is also possible to smoothly perform the deceleration assistance by arbitration of the types of deceleration assistance.

In the second embodiment, which has been described above, several types of deceleration assistance are targets of arbitration. In contrast, it is acceptable that a plurality of types of acceleration assistance may be targets of arbitration. Accordingly, for example, when a request for acceleration by vehicle-to-vehicle distance control assistance and a request for acceleration by constant speed traveling assistance are made within a specified period of time, the vehicle is permitted for acceleration control based on one request for acceleration. It is, thereby, possible to suppress performance of a plurality of types of acceleration control or unnecessary performance of the acceleration control.

In each of the above-described embodiments, a time at which individual movement paths intersect is assumed as an example in which the movement path of the assistance target vehicle intersects the movement path of a movable body. Collision avoiding assistance is performed based on the first time TTC and second time TTV which show each of the movement paths. In addition thereto, the individual movement paths used in the collision avoiding assistance may be any paths as long as they intersect at the same site. It is acceptable that an angle at the time when the paths intersect with each other is an angle smaller than 90 degrees or an angle greater than 90 degrees.

Figure 12:
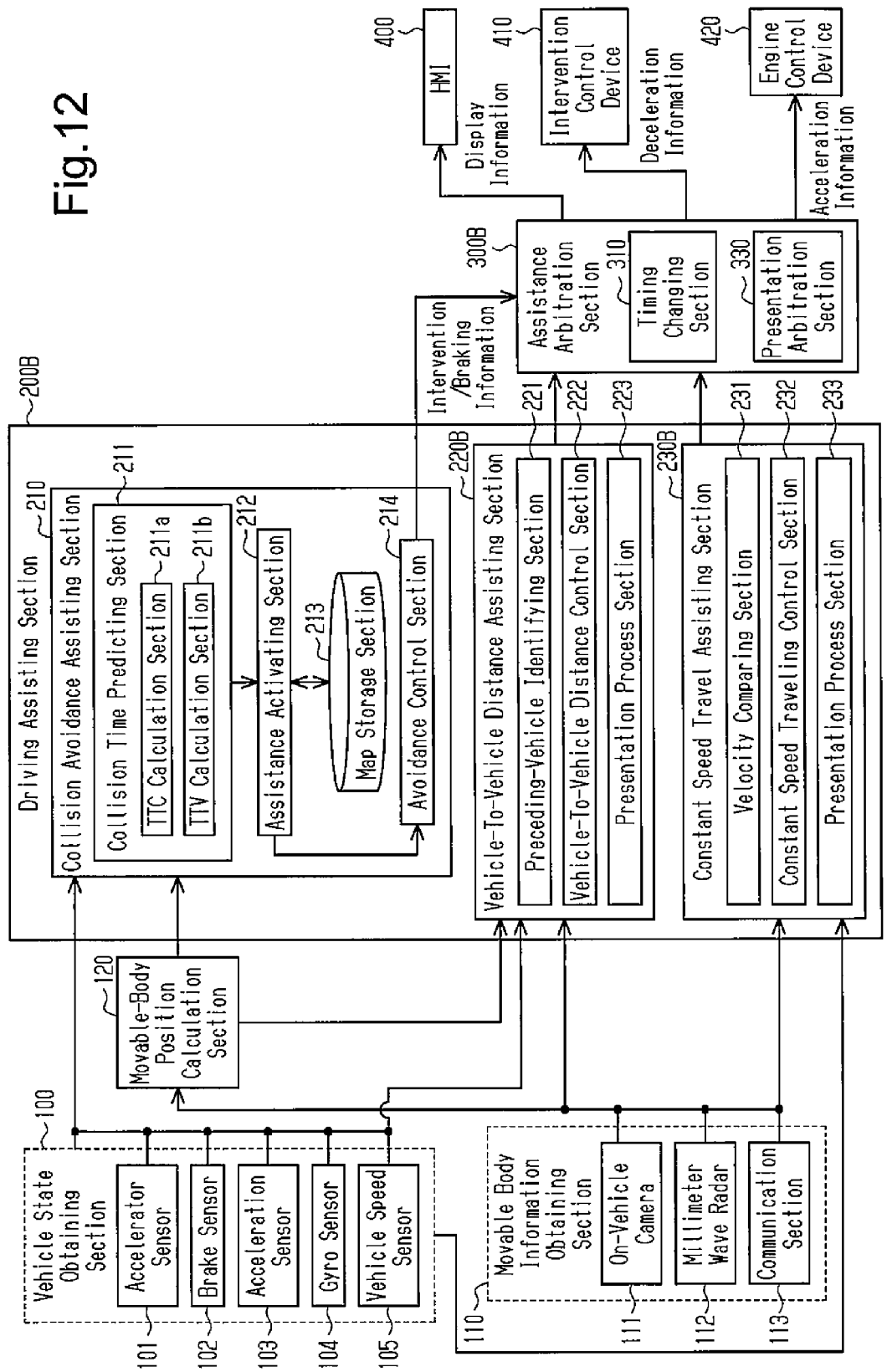
FIG. 12 is a block diagram showing a schematic configuration of a vehicle to which a driving assistance apparatus and a driving assistance method of another embodiment of the present invention are applied.

In each of the above-described embodiments, vehicle control performed by the intervention control device 410 and the engine control device 420 is a target of the arbitration process. Further, content of voice guidance by the HMI 400 and guidance by using pictures may be targets of the arbitration process. Accordingly, as shown, for example, in FIG. 12 as a drawing corresponding to FIG. 1 described previously, a vehicle-to-vehicle distance assisting section 220B, which forms the section 200B, is also provided with a presentation process section 223, which generates presentation information for presenting voice guidance and picture guidance for vehicle-to-vehicle distance assistance to the driver. Further, a constant speed travel assisting section 230B, which forms the driving assisting section 200B, is also provided with a presentation process section 233, which generates presentation information for presenting voice guidance and picture guidance for constant speed traveling assistance to the driver. Further, an assistance arbitration section 300B is also provided with a presentation arbitration section 330, which performs a process for arbitrating the presentation information by the HMI 400. Accordingly, the presentation process section 223 of the vehicle-to-vehicle distance assisting section 220B generates presentation information for guiding, for example, a target speed necessary for maintaining the distance to a preceding vehicle at a specified value, deceleration, and acceleration for the driver based on control amounts calculated by the vehicle-to-vehicle distance control section 222. Next, the presentation process section 223 outputs the thus generated information to the assistance arbitration section 300B. Still further, the presentation process section 233 of the constant speed travel assisting section 230B generates presentation information for guiding, for example, the thus set target speed, the deceleration, the acceleration, based on control amounts calculated by the constant speed traveling control section 232. Moreover, the presentation process section 233 outputs the thus generated information to the presentation arbitration section 330 of the assistance arbitration section 300B. When presentation information for prompting acceleration of the vehicle is input from the vehicle-to-vehicle distance assisting section 220B or the constant speed travel assisting section 230B during performance of the deceleration guidance for collision avoiding assistance by the HMI 400 based on the intervention/control information, the presentation arbitration section 330 suspends the presentation information until the lapse of a specified period of time from termination of the deceleration guidance for collision avoiding assistance. Moreover, after the lapse of the specified period of time from termination of the deceleration guidance for collision avoiding assistance, the presentation arbitration section 330 outputs the thus suspended presentation information to the HMI 400. As a result, the acceleration guidance by the HMI 400 is suspended until the lapse of the specified period of time from termination of guidance for collision avoiding assistance. Thereby, it is possible to suppress the deceleration guidance by collision avoiding assistance and the acceleration guidance by acceleration assistance from being performed within a short period of time and also suppress repeated performance of guidance, the content of which are conflicting, within a certain period of time. Thus, driving assistance by the HMI 400 can be performed appropriately. As with the deceleration arbitration section 320 of the second embodiment which has been described previously, it is acceptable that the presentation arbitration section 330 arbitrates, as targets, the deceleration guidance based on intervention/control information from the collision avoidance assisting section 210 and the deceleration guidance based on deceleration information from the vehicle-to-vehicle distance assisting section 220B or the constant speed travel assisting section 230B. Thereby, it is possible to suppress plural pieces of information different in content of the deceleration guidance, for example, "in order to avoid collision, reduce the traveling speed to 20 km/h" and "in order to maintain the vehicle-to-vehicle distance, reduce the traveling speed to 20 km/h" from being presented to the driver via the HMI 400. Accordingly, it is also possible to suppress plural pieces of information overlapping in content of the deceleration guidance, for example, "in order to avoid collision, reduce the traveling speed to 30 km/h" and "for maintaining the vehicle-to-vehicle distance, reduce the traveling speed to 20 km/h" from being presented to the driver via the HMI 400. Further, only guidance by the HMI 400 may be a target of arbitration.

In each of the above-described embodiments, the collision avoiding assistance by the collision avoidance assisting section 210 and the vehicle-to-vehicle distance assistance by the vehicle-to-vehicle distance assisting section 220 are targets of an arbitration process. Further, in each of the embodiments, the collision avoiding assistance by the collision avoidance assisting section 210 and the constant speed traveling assistance by the constant speed travel assisting section 230 are targets of arbitration. In addition thereto, it is acceptable that the vehicle-to-vehicle distance assistance by the vehicle-to-vehicle distance assisting section 220 and the constant speed traveling assistance by the constant speed travel assisting section 230 are targets of arbitration. Accordingly, when the vehicle-to-vehicle distance assisting section 220 performs, for example, deceleration assistance in ensuring the vehicle-to-vehicle distance to a specified value, even if the traveling speed of the assistance target vehicle is lower than a set speed, the constant speed travel assisting section 230 performs the acceleration assistance after the lapse of a specified period of time. Thereby, types of driving assistance in a conflicting assistance mode such as the acceleration assistance and the deceleration assistance by the vehicle-to-vehicle distance assisting section 220 and the constant speed travel assisting section 230 are suppressed from being activated within the specified period of time. Thereby, it is possible to smoothly activate the vehicle-to-vehicle distance assistance and the constant speed traveling assistance. Further, accordingly, when the vehicle-to-vehicle distance assisting section 220 makes, for example, a request for activating the deceleration assistance for ensuring the vehicle-to-vehicle distance to a specified value and also makes a request for activating the deceleration assistance in reducing the traveling speed of the assistance target vehicle to a set speed, only the deceleration assistance having a greater deceleration amount is performed. Thereby, it is possible to prevent continuous performance of driving assistance in the same assistance mode within a specified period of time and to attain smooth driving assistance.

Figure 13:
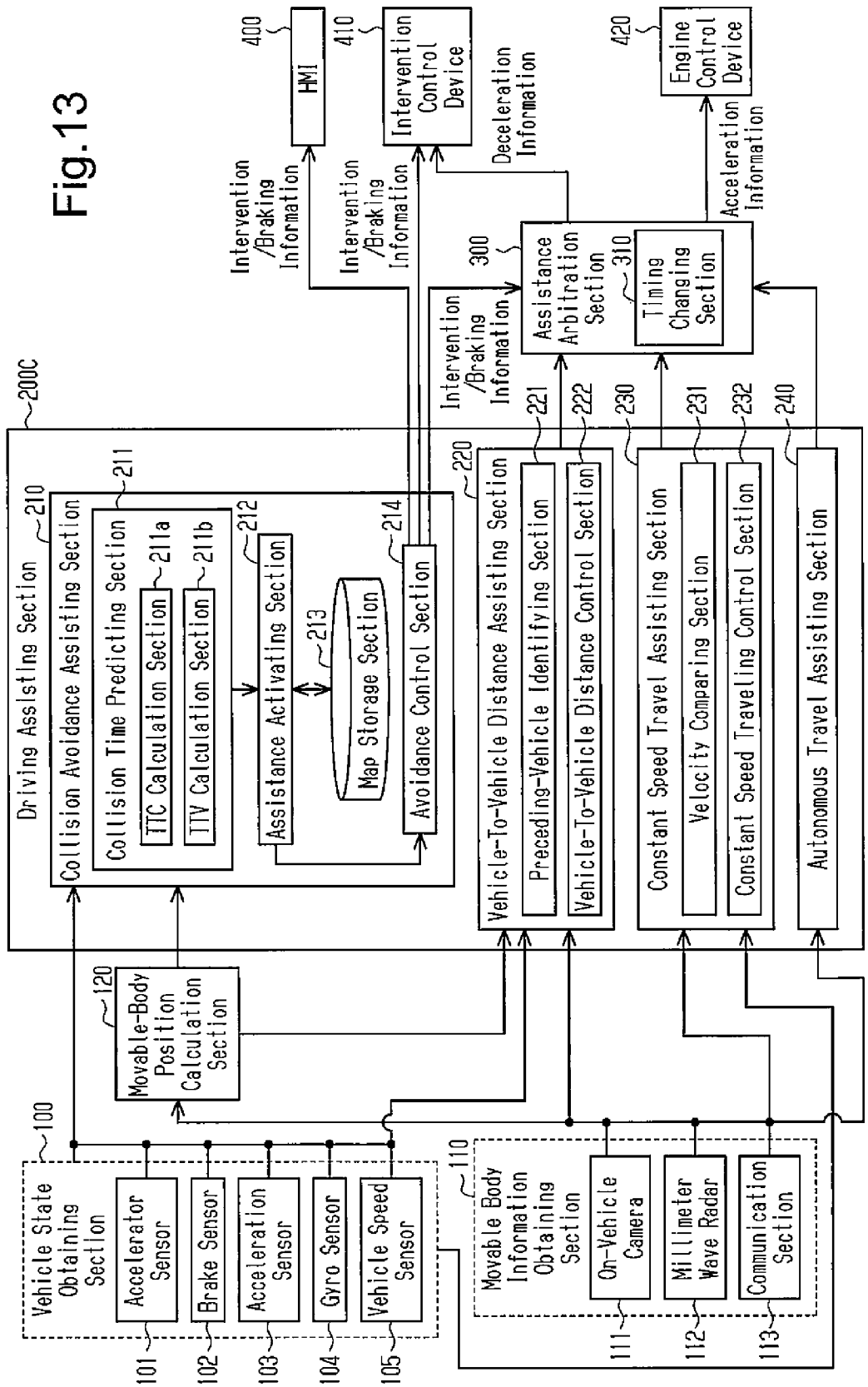
FIG. 13 is a block diagram showing a schematic configuration of a vehicle to which a driving assistance apparatus and a driving assistance method of another embodiment of the present invention are applied.

In each of the above-described embodiments, the assistance element has been configured by three elements, that is, the collision avoidance assisting section 210, the vehicle-to-vehicle distance assisting section 220 and the constant speed travel assisting section 230. Further, as shown in FIG. 13, which is a drawing corresponding to FIG. 1, the driving assisting section 200C may be configured, as an assistance element, to have an autonomous travel assisting section 240 for assisting autonomous travel of the assistance target vehicle. Accordingly, there is arbitrated autonomous travel assistance by the autonomous travel assisting section 240 and driving assistance by other assistance elements. Next, even a vehicle to which more versatile types of driving assistance are given can be made appropriate for driving assistance. It is also acceptable that the assistance element is configured by at least two elements of the collision avoidance assisting section 210, the vehicle-to-vehicle distance assisting section 220, the constant speed travel assisting section 230 and the autonomous travel assisting section 240. Moreover, a mode in combination thereof can be changed whenever necessary. Further, the assistance element may be any assistance element as long as it performs driving assistance that assists in driving a vehicle and can be changed whenever necessary.

Figure 14:
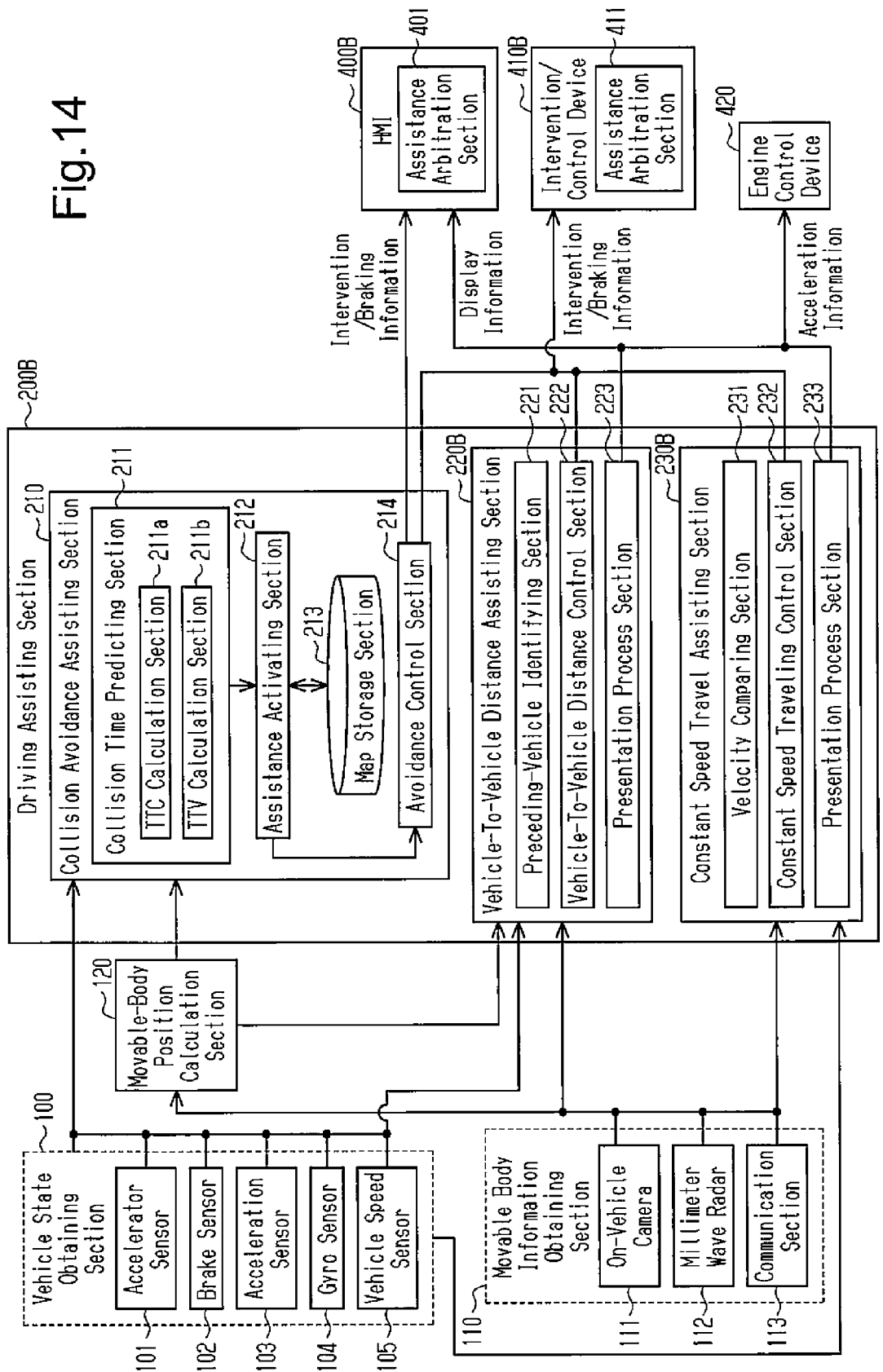
FIG. 14 is a block diagram showing a schematic configuration of a vehicle to which a driving assistance apparatus and a driving assistance method of another embodiment of the present invention are applied.

In each of the above-described embodiments, the assistance arbitration section 300 is configured separately from the HMI 400 and the intervention control device 410. In addition thereto, as shown in FIG. 14, which is a drawing corresponding to FIG. 12, the HMI 400B and the intervention control device 410B may be configured to have an assistance arbitration section 401 and an assistance arbitration section 411 similar in function to the assistance arbitration section 300. Accordingly, the HMI 400B and the intervention control device 410B are able to arbitrate a plurality of types of driving assistance by themselves, even if a request for activating the types of driving assistance is made by the driving assisting section 200B. It is also possible to change, whenever necessary, a site at which the assistance arbitration section is installed. For example, each of the driving assisting sections 200, 200B and 200C, is able to have the assistance arbitration section.

In each of the above-described embodiments, the driving assisting section 200 and the assistance arbitration section 300 are mounted on the vehicle. In addition thereto, the driving assisting section 200 and the assistance arbitration section 300 may be configured by, for example, application programs installed in a multifunction phone such as a smart phone. Accordingly, the multifunction phone determines whether a suppression condition is met based on map information retained at the multifunction phone and traffic information, which can be obtained via the Internet or the like. The multifunction phone performs driving assistance via, for example, voice guidance and picture guidance. Thereby, even a vehicle with no navigation system can be given driving assistance in an appropriate manner. Further, the multifunction phone is great in versatility. Therefore, it is able to appropriately perform driving assistance for more situations. In general, the multifunction phone is often provided with a GPS and map information. Therefore, based on latitude/longitude information and the map information obtained by the GPS, it is possible to identify a position of the assistance target vehicle and also to identify traveling environments of the assistance target vehicle. Then, based on the position of the vehicle and the traveling environments that can be identified, it is possible to calculate the first time TTC and the second time TTV. Further, the multifunction phone is used by many users. Therefore, the driving assisting section 200 and an assistance suppressing section 150 are installed on the multifunction phone, thus making it possible to realize appropriate driving assistance in many situations.

In each of the above-described embodiments, assistance for prompting the deceleration of the assistance target vehicle and assistance for prompting the acceleration thereof are arbitrated. In addition thereto, for example, when the assistance target vehicle is provided with a plurality of assistance elements for prompting a change in course, driving assistance may be arbitrated based on each of the assistance elements.

In each of the above-described embodiments, different types of driving assistance in a conflicting assistance mode are targets arbitration. In addition thereto, for example, arbitration may be made not for assistance in prompting each of the deceleration assistance and the change in course but may be made for assistance which is not in a conflicting relationship. Accordingly, it is possible to increase types of driving assistance that can be arbitrated.

In each of the above-described embodiments, upon detection of a request for activating driving assistance based on the second assistance element during performance of driving assistance based on the first assistance element, as arbitration, a delay process for delaying the time at which the driving assistance based on the second assistance element is activated is performed. Further, in each of the embodiments, upon detection of the request for activating driving assistance based on the second assistance element after termination of performance of the driving assistance based on the first assistance element but before the lapse of a specified period of time, there is performed a delay process for delaying the time at which driving assistance based on the second assistance element is activated. In addition thereto, in place of the delay process, a suppression process for suppressing the activation of driving assistance based on the second assistance element can be performed. Accordingly, when the request for activating driving assistance based on the second assistance element is detected during performance of the driving assistance based on the first assistance element, activation of driving assistance based on the second assistance element is suppressed. Further, when the request for activating driving assistance based on the second assistance element is detected after termination of performance of driving assistance based on the first assistance element but before the lapse of a specified period of time, the activation of driving assistance based on the second assistance element is suppressed. Accordingly, there will be performed no driving assistance based on the second assistance element which has been requested during performance of driving assistance based on the first assistance element or before the lapse of a specified period of time. Moreover, when a request for activating driving assistance based on the second assistance element is newly made after termination of performance of driving assistance based on the first assistance element or after the lapse of a specified period of time, the activation thereof will be permitted. Thereby, at the time at which a request for activating driving assistance based on the second assistance element is made again, in other words, at the time at which driving assistance based on the second assistance element is greatly needed, the activation will be permitted.

In each of the above-described embodiments, upon detection of a request for activating driving assistance based on the second assistance element, which forms a plurality of assistance elements, during performance of driving assistance based on the first assistance element, as arbitration, one of the delay process and the suppression process for driving assistance based on the second assistance element is performed. In addition thereto, when a request is detected for activating driving assistance based on the second assistance element, which forms the assistance elements, during performance of driving assistance based on the first assistance element, the types of driving assistance may be compared in terms of priority. After the comparison, one of the delay process and the suppression process may be given to driving assistance that has been found to have lower priority. Accordingly, when a request for activating two or more types of driving assistance based on the assistance elements is made within a specified period of time, driving assistance higher in priority is preferentially performed. Thereby, appropriate driving assistance is performed in accordance with the traveling environments. Further, in each of the above-described embodiments, upon detection of the request for activating driving assistance based on the second assistance element after termination of performance of driving assistance based on the first assistance element but before the lapse of a specified period of time, as arbitration, one of the delay process and the suppression process for driving assistance based on the second assistance element is performed. In addition thereto, when the request for activating driving assistance based on the second assistance element, which forms the assistance elements, is detected after termination of performance of driving assistance based on the first assistance element but before the lapse of a specified period of time, the driving assistances may be compared in terms of priority. After the comparison, one of the delay process and the suppression process may be given to driving assistance that has been found to have lower priority. Accordingly, when a request for activating two or more types of driving assistance based on the assistance elements is made within a specified period of time, driving assistance high in priority is preferentially performed. Thereby, appropriate driving assistance is performed in accordance with the traveling environments. For example, among the collision avoiding assistance, the vehicle-to-vehicle distance assistance, the constant speed traveling assistance, and the autonomous travel assistance, it is preferable that the collision avoiding assistance is given the highest priority.

DESCRIPTION OF THE REFERENCE NUMERALS

100 . . . Vehicle state obtaining section, 101 . . . Accelerator sensor, 102 . . . Brake sensor, 103 . . . Acceleration sensor, 104 . . . Gyro sensor, 105 . . . Vehicle speed sensor, 110 . . . Movable body information obtaining section, 111 . . . On-vehicle camera, 112 . . . Millimeter wave radar, 113 . . . Communication apparatus, 120 . . . Movable body position calculation section, 140 . . . HMI, 150 . . . Assistance suppressing section, 200, 200B, 200C . . . Driving assisting section, 210 . . . Collision avoidance assisting section, 211 . . . Collision time predicting section, 211a . . . TTC calculation section, 211b . . . TTV calculation section, 212 . . . Assistance activating section, 213 . . . Map storage section, 214 . . . Avoidance control section, 220, 220B . . . vehicle-to-vehicle distance assisting section, 221 . . . Preceding vehicle identifying section, 222 . . . vehicle-to-vehicle distance control section, 223 . . . Presentation process section, 230, 230B . . . Constant speed travel assisting section, 232 . . . Constant speed traveling control section, 233 . . . Presentation process section, 240 . . . Autonomous travel assisting section, 300, 300A, 300B . . . Assistance arbitration section, 310 . . . Timing changing section, 320 . . . Deceleration arbitration section, 330 . . . Presentation arbitration section, 400, 400B . . . HMI, 401 . . . Assistance arbitration section, 410, 410B . . . Intervention control device, 411 . . . Assistance arbitration section, 420 . . . Engine control device, A1 . . . Non-assistance region, A2 . . . Assistance region, Cr . . . Vehicle which is assistance target, SC . . . Street crossing, SG . . . Signal generator, A21 . . . HMI area, A22 . . . Intervention control area, A23 . . . Emergency intervention control area.

The invention claimed is:

1. A driving assistance apparatus that assists in driving a vehicle, comprising:
a driving assisting section that performs different types of driving assistance by a plurality of assistance elements; and
an assistance arbitration section, which performs arbitration between at least two or more types of driving assistance when the at least two or more types of driving assistance are performed based on the assistance elements by the driving assisting section within a specified period of time that has been specified, wherein
when a request for activating driving assistance based on a second assistance element, which is one of the assistance elements, is detected during performance of driving assistance based on a first assistance element, which is one of the assistance elements, or when a request for activating driving assistance based on the second assistance element is detected after termination of performance of driving assistance based on the first assistance element and before the lapse of the specified period of time, the assistance arbitration section performs, as the arbitration, one of a delay process for delaying the time at which driving assistance is activated based on the second assistance element and a suppression process for suppressing activation of driving assistance based on the second assistance element such that within the specified period of time, simultaneous performance of the driving assistance based on the first assistance element and the driving assistance based on the second assistance element are suppressed, and repeated performance of the first and second assistance elements are suppressed.

2. The driving assistance apparatus according to claim 1, wherein at least two types of driving assistance based on the assistance elements are different types of driving assistance in conflicting assistance modes.

3. The driving assistance apparatus according to claim 2, wherein the different types of driving assistance in conflicting assistance modes include acceleration assistance, which assists in acceleration of a vehicle that is an assistance target, and deceleration assistance, which assists in deceleration of the vehicle, which is an assistance target.

4. The driving assistance apparatus according to claim 3, wherein the assistance elements include at least two of
a vehicle-to-vehicle distance assisting section, which assists in controlling a distance between the assistance target vehicle and a preceding vehicle that travels ahead of the assistance target vehicle in the advancing direction,
a constant speed travel assisting section, which assists the assistance target vehicle in traveling at a constant speed,
a collision avoidance assisting section, which assists in avoidance of collision between the assistance target vehicle and a physical object present in the vicinity of the vehicle, and an autonomous travel assisting section, which assists the assistance target vehicle in traveling autonomously.

5. The driving assistance apparatus according to claim 4, wherein the physical object is a movable body, based on a relationship between a first time taken by the assistance target vehicle to reach a meeting point where the vehicle meets the movable body and a second time taken by the movable body to reach the meeting point, the collision avoidance assisting section assists in avoidance of collision between the vehicle and the movable body, and the assistance arbitration section arbitrates, as targets of the arbitration, deceleration assistance performed by the collision avoidance assisting section to assist in avoidance of collision between the assistance target vehicle and the physical object and acceleration assistance performed, as acceleration control, on the assistance target vehicle by at least one of the vehicle-to-vehicle distance assisting section, the constant speed travel assisting section, and the autonomous travel assisting section.

6. The driving assistance apparatus according to claim 5, wherein the collision avoidance assisting section performs a process for assisting in avoidance of collision between the assistance target vehicle and the movable body on the condition that each of the first time and the second time is less than or equal to a specified threshold value, and the assistance arbitration section performs a process for suppressing activation of the acceleration assistance by at least one of the vehicle-to-vehicle distance assisting section, the constant speed travel assisting section, and the autonomous travel assisting section in a period of time during which the first time and the second time are less than or equal to the threshold value.

7. The driving assistance apparatus according to claim 5, wherein the collision avoidance assisting section has a map in which an assistance region of performing driving assistance and non-assistance region of performing no driving assistance are specified with respect to a relative relationship between the first time and the second time, and the collision avoidance assisting section performs the collision avoiding assistance by referring to the map.

8. The driving assistance apparatus according to claim 1, wherein at least two types of driving assistance based on the assistance elements include deceleration assistance, which prompts deceleration of the assistance target vehicle, the driving assisting section calculates a control amount in accordance with required deceleration for each assistance element, and when detecting requests for activating two or more types of deceleration assistance within the specified period of time, the assistance arbitration section permits, as the arbitration, activation of only deceleration assistance having a maximum control amount of the thus calculated control amounts.

9. A driving assistance method for assisting in driving a vehicle, comprising:

performing different types of driving assistance by a plurality of assistance elements; and executing arbitration between at least two types of driving assistance when the at least these two types of driving assistance based on an assistance element are performed via performing different types of driving assistance within a specified period of time that has been specified, wherein in executing arbitration, when a request for activating driving assistance based on a second assistance element, which is one of the assistance elements, is detected during performance of driving assistance based on a first assistance element, which is one of the assistance elements, or when a request for activating driving assistance based on the second assistance element is detected after termination of performance of driving assistance based on the first assistance element and before the lapse of the specified period of time, one of delaying the time at which activation of driving assistance based on the second assistance element and suppressing activation of driving assistance based on the second assistance element is performed such that within the specified period of time, simultaneous performance of the driving assistance based on the first assistance element and the driving assistance based on the second assistance element are suppressed, and repeated performance of the first and second assistance elements are suppressed.

10. The driving assistance method according to claim 9, wherein different types of driving assistance in conflicting assistance modes are selected as at least two types of driving assistance based on the assistance elements.

11. The driving assistance method according to claim 10, wherein as the different types of driving assistance in conflicting assistance modes, there are selected acceleration assistance, which assists in acceleration of the assistance target vehicle, and deceleration assistance, which decelerates the assistance target vehicle.

12. The driving assistance method according to claim 11, wherein as driving assistance by the assistance elements, at least two types of assistance are selected from vehicle-to-vehicle distance assistance, which assists in controlling a distance between the assistance target vehicle and a preceding vehicle, which travels ahead of the assistance target vehicle in the advancing direction, constant speed traveling assistance, which assists the assistance target vehicle in traveling at a constant speed, collision avoiding assistance, which assists in avoidance of collision between the assistance target vehicle and a physical object present in the vicinity of the vehicle, and autonomous travel assistance, which assists the assistance target vehicle in traveling autonomously.

13. The driving assistance method according to claim 12, wherein a movable body is selected as the physical object, as the collision avoiding assistance, based on a relationship between a first time taken by the assistance target vehicle to reach a meeting point where the movable body meets the vehicle and a second time taken by the movable body to reach the meeting point, assistance that assists in avoidance of collision between the vehicle and the movable body is performed, and in executing arbitration, arbitration is performed between deceleration assistance for avoiding collision between the assistance target vehicle and a physical object by the collision avoiding assistance and acceleration assistance for accelerating a vehicle that is performed as at least one of the vehicle-to-vehicle distance assistance, the constant speed traveling assistance, and the autonomous travel assistance.

\* \* \* \* \*